US012644035B1

(12) United States Patent　　　　　(10) Patent No.:　　US 12,644,035 B1

Pisklak et al.　　　　　　　　　　　　(45) Date of Patent:　　　　Jun. 2, 2026

(54) METHOD TO TAILOR GEOPOLYMER COMPOSITIONS FOR EFFECTIVE ZONAL ISOLATION

(71) Applicant: Halliburton Energy Services, Inc., Houston, TX (US)

(72) Inventors: Thomas Jason Pisklak, Houston, TX (US); Siva Rama Krishna Jandhyala, Houston, TX (US); Heloisa Helena Fabricio Fernandes, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/225,559

(22) Filed: Jun. 2, 2025

(51) Int. Cl.
　　*C09K 8/46*　　　(2006.01)
　　*C04B 28/00*　　　(2006.01)
　　*C04B 40/00*　　　(2006.01)
　　*C04B 103/10*　　　(2006.01)
　　*E21B 33/14*　　　(2006.01)

(52) U.S. Cl.
　　CPC .............. *C09K 8/46* (2013.01); *C04B 28/006* (2013.01); *C04B 40/0032* (2013.01); *E21B 33/14* (2013.01); *C04B 2103/10* (2013.01)

(58) Field of Classification Search
　　CPC ..... C09K 8/46; C04B 28/006; C04B 40/0032; C04B 2103/10; E21B 33/14
　　See application file for complete search history.

(56) References Cited

U.S. PATENT DOCUMENTS

| | | | |
|---|---|---|---|
| 1,116,201 A | 11/1914 | Appelbaum | |
| 7,794,537 B2 | 9/2010 | Barlet-Gouedard et al. | |
| 7,794,538 B2 | 9/2010 | Marshall | |
| 9,346,711 B2 | 5/2016 | Chatterji et al. | |
| 9,840,653 B2 | 12/2017 | Chatterji et al. | |
| 11,162,015 B2 | 11/2021 | Pisklak et al. | |
| 11,198,649 B2 | 12/2021 | Singh et al. | |
| 11,242,479 B2 | 2/2022 | Pisklak et al. | |
| 11,332,654 B2 | 5/2022 | Pisklak et al. | |
| 11,512,240 B2 | 11/2022 | Pisklak et al. | |
| 11,692,122 B2 | 7/2023 | Pisklak et al. | |
| 2020/0369942 A1* | 11/2020 | Singh .................. | C04B 40/0032 |

(Continued)

OTHER PUBLICATIONS

Hongguang Wang, The Effect of Various Si/Al, Na/Al Molar Ratios and Free Water on Micromorphology and Macro-Strength of Metakaolin-Based Geopolymer, MDPI, Materials 2021, 14, 3845. 16 pages.

(Continued)

*Primary Examiner* — Crystal J Lee

(74) *Attorney, Agent, or Firm* — Conley Rose, P.C.; Rodney B. Carroll

(57)　　　　　　　ABSTRACT

A method including providing a geopolymer recipe comprising a geopolymer material, and a required compressive strength, using a compressive strength model of the geopolymer recipe to predict a compressive strength and comparing the required compressive strength to the predicted compressive strength output of the compressive strength model, preparing a geopolymer composition based at least in part on the compressive strength model, and introducing the geopolymer composition into a subterranean formation. The geopolymer material can contain an aluminosilicate source, a metal silicate source, an alkaline activator, and water.

20 Claims, 6 Drawing Sheets

I ⟶

(56) References Cited

U.S. PATENT DOCUMENTS

2021/0171408 A1* 6/2021 Singh .................. G01N 33/383

OTHER PUBLICATIONS

Giovanni Dal Poggetto et al., Efficient Addition of Waste Glass in MK-Based Geopolymers: Microstructure, Antibacterial and Cytotoxicity Investigation, MDPI. Polymers 2021, 13, 1493. 18 pages.
Farzad Haghighat-Nejad, Petroleum Technology/Drilling and Well Technology, University of Stavanger, Faculty of Science and Technology Master's Thesis, Spring semester, 2019. 76 pages.
Lais Alves et al., A Comparative Study on the Effect of Different Activation Solutions and Formulations on the Early Stage Geopolymerization Process. MATBUD2020 Scientific Technical Conference Oct. 2020, Cracow, France. 13 pages.

* cited by examiner

I

| CREATING/PROVIDING MODEL OF COMPRESSIVE STRENGTH | 5 |

| PROVIDING/ADJUSTING GEOPOLYMER RECIPE AND REQUIRED COMPRESSIVE STRENGTH | 10 |

| PROVIDING PREDICTED COMPRESSIVE STRENGTH OF GEOPOLYMER RECIPE VIA MODEL | 20 |

REPEATING
35

| COMPARING REQUIRED COMPRESSIVE STRENGTH TO PREDICTED COMPRESSIVE STRENGTH OUTPUT OF THE MODEL | 30 |

| UTILIZING GEOPOLYMER COMPOSITION | 40 |

METHOD TO TAILOR GEOPOLYMER COMPOSITIONS FOR EFFECTIVE ZONAL ISOLATION

CROSS-REFERENCE TO RELATED APPLICATIONS

None.

STATEMENT REGARDING FEDERALLY SPONSORED RESEARCH OR DEVELOPMENT

Not applicable.

BACKGROUND

The present disclosure relates to methods for treating subterranean formations. More particularly, embodiments may be directed to designing geopolymer compositions, such as geopolymer cements, geopolymer settable spacers, or geopolymer thixotropic fluids for applications such as oil and gas operations, wherein the geopolymer compositions are tailored based at least partially on modeling of compressive strength.

BRIEF DESCRIPTION OF THE DRAWINGS

Illustrative examples of the present disclosure are described in detail below with reference to the attached drawing figures, which are incorporated by reference herein, wherein like reference numerals represent like parts and wherein.

Figure 1:
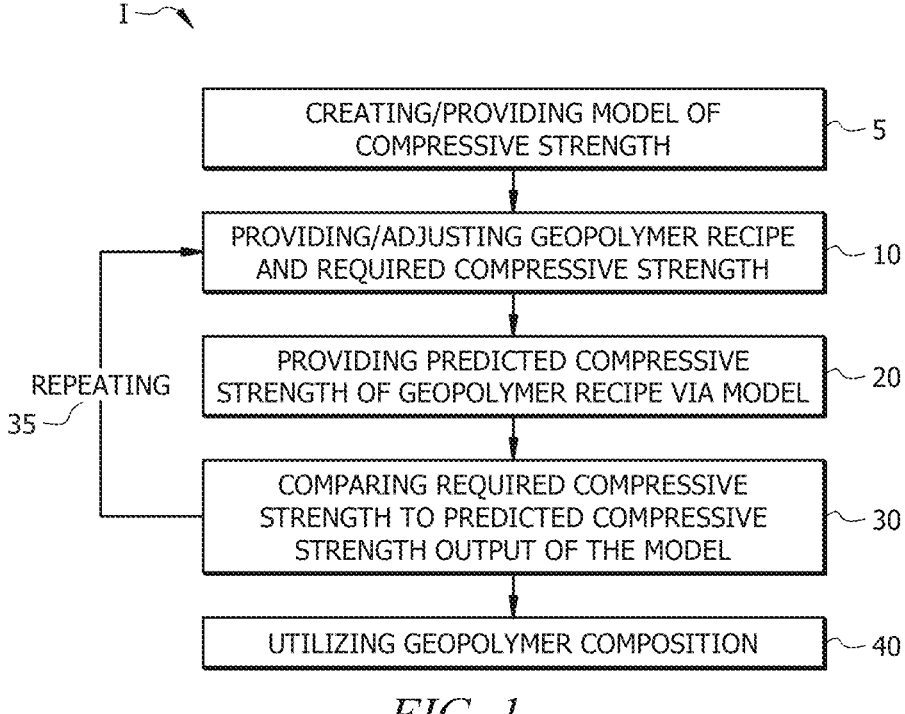
FIG. 1 is a schematic flow diagram of a method, according to embodiments of this disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure. Accordingly, the illustrated figures are only exemplary and are not intended to assert or imply any limitation with regard to the environment, architecture, design, or process in which different examples may be implemented.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It should be noted that when "about" is used herein at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, particle sizes, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the illustrative embodiments described herein. At the very least, and not as an attempt to limit the application of the doctrine of equivalents to the scope of the claim, each numerical parameter should at least be construed in light of the number of reported significant digits and by applying ordinary rounding techniques. The term "about" as used herein can thus allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques.

In the following discussion and in the claims, the terms "including" and "comprising" are used in an open ended fashion, and thus should be interpreted to mean "including, but not limited to." Unless otherwise indicated, as used throughout this document, "or" does not require mutual exclusivity.

The terms uphole and downhole can be used to refer to the location of various components relative to the bottom or end of a well. For example, a first component described as uphole from a second component can be further away from the end of the well than the second component. Similarly, a first component described as being downhole from a second component can be located closer to the end of the well than the second component. The term "downhole" as used herein refers to under the surface of the earth, such as a location within or fluidly connected to a wellbore.

If there is any conflict in the usages of a word or term in this specification and one or more patent or other documents that may be incorporated herein by reference, the definitions that are consistent with this specification should be adopted.

Compositions, such as cement compositions utilized in wellbore cementing operations can be tailored, as described herein, for well specific loads, for example to ensure that application needs (e.g., zonal isolation) are met. A goal of such tailoring can be to achieve the necessary performance properties, such as compressive strength, Young's modulus, etc. These properties are governed by the underlying reaction. Geopolymer reactions are quite different from that of Portland cements. Thus, tailoring of geopolymer compositions, as described herein, can utilize an understanding of the relationship between a specific performance property, such as compressive strength, and the geopolymer design or recipe.

Herein provided is a method that enables tailoring of a geopolymer composition, such as a geopolymer cement, a geopolymer settable spacer, and/or a geopolymer thixotropic fluid (all referred to hereinafter for simplicity as a "geopolymer composition", a "geopolymer cement", a "geopolymer cement composition," a "geopolymer sealant," a "cement", or a "geopolymer slurry") for target performance properties (e.g., compressive strength). The method utilizes a data-driven model to relate compressive strength of various geopolymer designs with the composition and test conditions thereof. The types of models described herein enable tailoring the composition of the geopolymer for a target or "required" compressive strength.

Sealant materials, such as cements, are utilized in numerous applications. For example, in well cementing, such as well construction and remedial cementing, cement compositions are commonly utilized. Cement slurries may be used in a variety of subterranean applications. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement slurry may be pumped into an annulus between the walls of the wellbore and the exterior surface of the pipe string disposed therein. The cement slurry may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement slurry within a reasonable time period after placement in the subterranean formation. Oftentimes several cement slurries with varying additives are tested to see if they meet the material engineering requirements for a particular well. The process of selecting the components of the cement slurry can be done by a best estimate approach by utilizing previous slurries and modifying them until a satisfactory solution is reached, for example via successive approximation, iterative refinement, trail-and-error, iterative convergence, or the like. The process may be time consuming and the resulting slurry may be complex. Furthermore, the cement components available in any one particular region may vary in slurry from those of another region thereby further complicating the process of selecting a correct slurry.

A broad variety of cement compositions have been used in subterranean cementing operations. A particular challenge in cementing operations is the development of satisfactory mechanical properties in a settable composition within a reasonable time period after placement in the subterranean formation. During the life of a well, the subterranean cement sheath, for example, can undergo numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like. The present disclosure provides tailored geopolymer cement compositions meeting compressive strength requirements and methods of making and using same.

A method of this disclosure will now be made with reference to FIG. 1, which is a schematic of a method I, according to embodiments of this disclosure. Method I is a method (e.g., of treating a subterranean formation) comprising: creating and/or providing a compressive strength model of the geopolymer recipe (e.g., for a given time) at 5; providing/adjusting a geopolymer recipe (e.g., a geopolymer cement recipe, a geopolymer settable spacer recipe, or a geopolymer thixotropic fluid recipe) comprising a geopolymer material at 10, wherein the geopolymer material comprises an aluminosilicate source (also referred to herein simply as an "aluminosilicate"), a metal silicate source, an alkaline activator, and water; and a required compressive strength (e.g., a required ultimate compressive strength, and/or a required time dependent compressive strength); predicting a compressive strength (e.g., an ultimate compressive strength and/or a time dependent compressive strength) of a slurry according to the geopolymer recipe using a geopolymer compressive strength model at 20; comparing the predicted compressive strength of the slurry provided by the modeling to a compressive strength requirement (e.g., an ultimate compressive strength requirement and/or a time dependent compressive strength requirement) at 30; optionally, iteratively returning to blocks 10 and 20 when the predicted compressive strength of the slurry according to the geopolymer recipe provided by the modeling does not meet or exceed the compressive strength requirement (e.g., the ultimate compressive strength requirement and/or the time dependent compressive strength requirement); and when the predicted compressive strength of the slurry according to the geopolymer recipe provided by the modeling meets or exceeds the compressive strength requirement (e.g., the ultimate compressive strength requirement and/or the time dependent compressive strength requirement), utilizing a geopolymer composition according to the recipe at 40 . . . . Utilizing the geopolymer composition at 40 can comprise, for example, preparing the geopolymer composition according to the geopolymer recipe, and placing the geopolymer recipe in a subterranean formation (as described further hereinbelow with reference to FIG. 3, FIG. 4A, and FIG. 4B.

A method of this disclosure can comprise more or less steps than shown in FIG. 1, and, in embodiments, the steps can be performed in a different order than depicted and/or one or more steps can be repeated. For example, in embodiments, the method of FIG. 1 may start at block 10, were a compressive strength model is readily available for use. Alternatively, the method may start at block 10, then continue with the function of block 5, and then proceed to block 20. For example, in embodiments, a method of this disclosure comprises: providing a geopolymer recipe (e.g., a geopolymer cement recipe, a geopolymer settable spacer recipe, or a geopolymer thixotropic fluid recipe) comprising a geopolymer material at 10, wherein the geopolymer material comprises an aluminosilicate source (also referred to herein simply as an "aluminosilicate"), a metal silicate source, an alkaline activator, and water; and a required compressive strength (e.g., a required ultimate compressive strength, and/or a required time dependent compressive strength); creating and/or providing a compressive strength model of the geopolymer recipe (e.g., for a given time) at 5 and using the model to predict a compressive strength and comparing the required compressive strength (e.g., the required ultimate compressive strength and/or the required time dependent compressive strength) to the predicted compressive strength output of the model at 30; optionally, iteratively returning to blocks 10 and 20 when the predicted compressive strength of the slurry according to the geopolymer recipe provided by the modeling does not meet or exceed the compressive strength requirement (e.g., the ultimate compressive strength requirement and/or the time dependent compressive strength requirement); and when the predicted compressive strength of the slurry according to the geopolymer recipe provided by the modeling meets or exceeds the compressive strength requirement (e.g., the ultimate compressive strength requirement and/or the time dependent compressive strength requirement), utilizing a geopolymer composition according to the geopolymer recipe at 40. In embodiments, as noted above, utilizing the geopolymer composition comprises preparing a geopolymer slurry/composition based at least in part on the model; and introducing the geopolymer composition into a subterranean formation, as described further hereinbelow with reference to FIGS. 3-4B. In embodiments, introducing the geopolymer slurry/composition into the subterranean formation includes introducing the geopolymer cement composition into a wellbore annulus.

Modeling the compressive strength/providing the predicted strength via the model at 20 can comprise modeling the compressive strength (e.g., an ultimate compressive strength) of a slurry according to the geopolymer recipe as a function of at least one factor selected from (1) an atomic ratio of silicon to aluminum (Si/Al) of the aluminosilicate source, (2) a temperature, (3) a ratio of a mass of the metal silicate source to a mass of the aluminosilicate source, e.g., $$\left( \frac{\text{metal silicate mass}}{\text{aluminosilicate mass}} \right),$$

(4) a ratio of a mass of water to the mass of the aluminosilicate source, e.g., $$\left( \frac{\text{water mass}}{\text{aluminosilicate mass}} \right),$$

(5) a ratio of the mass of the aluminosilicate source to a mass of a slurry of the geopolymer recipe, e.g., $$\left( \frac{\text{aluminosilicate mass}}{\text{slurry mass}} \right),$$

and (6) a duration (e.g., a wait on cement time) of the slurry of the geopolymer recipe. The duration (e.g., wait on cement time) is the amount of time measured from placement of the pumpable cement slurry in the wellbore as time zero until the time that the slurry has reacted sufficiently (e.g., set-up or hardened) to proceed to the next step of the wellbore servicing operation. Accordingly, duration (e.g., wait on cement time) may also be expressed as the time of geopolymer recipe reaction from placement until the next step of the wellbore servicing reaction. As will be apparent to those of skill in the art and with the help of this disclosure, other factors can be utilized in the model in addition to and/or in place of factors (1)-(6), in embodiments.

The method can further comprise, when comparing of the required compressive strength to the predicted strength at 30 indicates that the predicted compressive strength output of the model is less than the required compressive strength, repeated 10, 20, and 30, and adjusting the geopolymer recipe at 10 to provide an adjusted geopolymer recipe, utilizing the model to determine an adjusted compressive strength of the adjusted geopolymer composition at 20 (e.g., an adjusted geopolymer composition having of conforming to, compositionally, the adjusted geopolymer recipe), and comparing the adjusted compressive strength of the adjusted geopolymer composition with the required compressive strength 30. In embodiments, the adjusted geopolymer composition has or conforms to, compositionally, the adjusted geopolymer recipe, or alternatively, the adjusted geopolymer recipe and the adjusted geopolymer composition are the same or interchangeable for purposes of the iterative process of 10, 20 and 30. Adjusting the geopolymer recipe during subsequent iterations at 10 can further comprise adjusting a concentration of the water, the aluminosilicate source, the metal silicate source, the alkali activator, or a combination thereof, in the geopolymer recipe. The method can further, at 35, comprise iteratively repeating the adjusting the geopolymer recipe to provide an adjusted geopolymer recipe at 10, the utilizing the model to determine an adjusted compressive strength of the adjusted geopolymer composition at 20, and the comparing the adjusted compressive strength of the adjusted geopolymer composition with the required compressive strength at 30 until the adjusted predicted compressive strength output of the model meets (e.g., is greater than or about equal to or within a percentage of) the required compressive strength at 30. In embodiments, the iteratively repeating 35 can optionally be performed until the adjusted compressive strength output of the model is within 50, 40, 30, 25, 20, 15, 10, 9, 8, 7, 6, 5, 4, 3, 2, or 1% of the required compressive strength, greater than the required compressive strength (e.g., at least 50, 40, 30, 25, 20, 15, 10, 9, 8, 7, 6, 5, 4, 3, 2, or 1% greater than the required compressive strength), at least equal to the required compressive strength, or about equal to the required compressive strength. Thus, preparing the geopolymer composition based at least in part on the model can further comprise, when the comparing indicates that the predicted compressive strength output of the model is less than the required compressive strength, repeating 10, 20, and 30, by adjusting the geopolymer recipe to provide an adjusted geopolymer recipe at 10, utilizing the model to determine an adjusted compressive strength of the adjusted geopolymer composition at 20, and comparing the adjusted compressive strength of the adjusted geopolymer composition with the required compressive strength 30 until the updated predicted compressive strength output of the model meets the required compressive strength at 30.

As noted in FIG. 1, the method I of this disclosure can further comprise creating and/or providing the compressive strength model, as described further hereinbelow. Creating the model at 5 can comprises at least one of modeling an ultimate compressive strength of the geopolymer recipe, or modeling a time dependency of compressive strength of the geopolymer recipe. The model can be a data-driven model, which is a computational model that can utilize historical data to establish relationships between input, internal, and output variables. Data-driven models have evolved from earlier statistical models, overcoming limitations posed by strict assumptions about probability distributions, and can provide valuable insights and predictions based on available data. Data-driven models include a wide range of techniques and methodologies for processing and analyzing large sets of data. Examples of data-driven models include linear and non-linear regression, fuzzy logic, neural networks, tree based models, global optimization, evolutionary computing, statistical learning theory, and Bayesian methods, among others.

In embodiments, the model is a machine learning model, a subfield of artificial intelligence, that is closely related to data-driven modeling and also stresses the use of historical data to create models that can make predictions and/or identify patterns. The data-driven model can incorporate machine learning techniques, such as regression, clustering, and classification, algorithms, to process and analyze data. The model created/provided at 5 can employ linear regression, or non-linear regression. A representative model is provided in Example 1 hereinbelow. One of skill in the art and with the help of this disclosure will be able to create a compressive strength model for use in predicting the compressive strength of the geopolymer slurry according to the geopolymer recipe at 20.

A method of this disclosure can further include providing and/or determining the required compressive strength, for example as included at 10 in the embodiment of FIG. 1. Determining the required compressive strength can be effected by any methods now known or discovered in future to determine/predict a required compressive strength for a given application. In various wellbore embodiments, for example, determining the required compressive strength can comprise performing near wellbore integrity analysis, based on well load and geometry of a given well.

The methods of this disclosure may thus include designing/tailoring geopolymer sealant/cement slurries/compositions, with a model of geopolymer compressive strength. As noted, a compressive strength model may include correlations of compressive strength on the factors, such as the exemplary six factors noted above, including time and temperature dependencies, the ratio of Si/Al of the aluminosilicate source, and the ratios of various components of the geopolymer recipe (e.g., the ratio of the metal silicate source mass to the aluminosilicate source mass, the ratio of the water mass to the aluminosilicate source mass, and the ratio of the aluminosilicate source mass to the slurry (including the water) mass). It is noted that the number of factors can be more that, less than, or equal to six, in various embodiments according to this disclosure. The methods may allow one of ordinary skill in the art, with the benefit of this disclosure, to design cement slurries containing geopolymers with a reduced number of iterations to reach a geopolymer cement slurry with required mechanical properties (e.g., compressive strength) for a particular application. The methods presented herein may be advantageous over traditional trial-and-error based cement slurry design processes as the trial-and-error methodology, while generally effective at finding a workable cement slurry, may be inefficient and time consuming and may result in a geopolymer cement slurry that has certain undesirable characteristics. Some undesirable characteristics may include a (e.g., large) number of components in the cement slurry, (e.g., elevated) concentrations of components in the cement slurry, excessive compressive strength beyond engineering requirements, complexity of the cement slurry, and others readily recognized by those of ordinary skill in the art. Further uses of the methods and systems described herein may be in automation of wellbore geopolymer cement slurry design.

Although only some models of compressive strength are illustrated herein, one of ordinary skill in the art, with the benefit of this disclosure should be able to derive equations for the modeling utilizing the factors described herein and/or additional factors without deviating from this disclosure.

A method of designing a cement slurry may include obtaining samples of cementitious materials that may be included in a cement slurry and physicochemical characterizing the cementitious materials to determine a mineralogical composition, a surface area, specific surface area, a particle size, and others well known in the art. Downhole temperature and pressure may be provided by wellbore logs produced by measurements taken while drilling or by open hole logging techniques. A geopolymer cement recipe may include the identity and amounts of components to make a geopolymer slurry/composition. For a geopolymer cement recipe, the ultimate strength may be predicted and the time dependent compressive strength development may be estimated. A cement slurry may then be prepared according to the recipe if the step of estimating strength using the model meets or exceeds the requirement. If the compressive strength meets or exceeds the requirements derived previously, the geopolymer cement slurry may be prepared and tested to verify the geopolymer cement recipe meets all requirements. If the geopolymer cement recipe does not meet the derived requirements, the slurry may be adjusted, for example, by adjusting the amount of one or more components thereof (e.g., metal silicate source, binder (e.g., aluminosilicate source), alkaline activator, water, etc.), increasing the density by decreasing the mass fraction of water, and/or by including cement set retarders or cement set accelerators. The adjusted slurry may then be prepared and tested to see if the adjusted slurry meets all requirements. If the cement slurry meets the requirements, the cement slurry may be selected to be utilized (e.g., prepared and pumped into a subterranean formation or other use location). The model used to predict the compressive strength can be updated, as additional data is obtained.

The methods of the present disclosure thus provide for the tailoring of geopolymer recipes/slurries/compositions that may include one or more geopolymer materials. The term geopolymer is used to describe an inorganic, typically bulk ceramic-like material that forms covalently bonded, non-crystalline (e.g., amorphous) networks, that may be inter-mingled with other phases. Some geopolymers can also be classified as alkali-activated cements or acid-activated binders, which are mainly produced by a chemical reaction between a chemically reactive aluminosilicate powder (e.g. metakaolin or other clay-derived powders, natural pozzolan, or suitable glasses), and an aqueous solution (alkaline or acidic) that causes this powder to react and re-form into a solid monolith. The most common pathway to produce geopolymers is by the reaction of aluminosilicate (e.g., metakaolin) with sodium silicate, which is an alkaline solution, as described herein, but other processes than those described below are also possible. As noted, geopolymers can be formed by chemical dissolution and subsequent re-condensation of various aluminosilicates and silicates to form a 3D-network or three-dimensional mineral polymer. The activator for the geopolymer cement may include, but is not limited to, metal hydroxides, chloride salts such as KCl, $CaCl_2$, NaCl, carbonates such as $Na_2CO_3$, silicates such as sodium silicate, aluminates such as sodium aluminate, and ammonium hydroxide. The aluminosilicate source for the geopolymer cement may include any suitable aluminosilicate, such as those noted herein. Aluminosilicate is a mineral including aluminum, silicon, and oxygen, plus counter-cations. A wide variety of suitable minerals may be an aluminosilicate source in that they may comprise alumino-silicate minerals. The metal silicate source may comprise any suitable metal silicate. A silicate is a compound con-taining an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$ Each silicate example may have one or more metal cations associated with each silicate molecule. Some suitable metal silicate sources and may include, without limitation, sodium silicate, magnesium silicate, and potassium silicate.

In embodiments, as noted above, the geopolymer materials of the present disclosure may include an aluminosilicate source, a metal silicate source, an alkali activator, and water. In embodiments, components of the geopolymer material may react to form a geopolymer. The geopolymer material can react to form a semi-crystalline amorphous material (SCM). Geopolymers can be described as a class of settable materials which rely on the dissolution and subsequent condensation of aluminosilicate precursors to form a hardened mass. Geopolymers also may be referred to as polysialates.

The production of a geopolymer may be called geosyn-thesis. In embodiments, geosynthesis may be a reaction process that may involve naturally occurring aluminosili-cates. In embodiments, geopolymers based on aluminosili-cates may be designed as poly(silate), which is a shorter version of poly(silicon-oxo-aluminate). In embodiments, the silate network can include silicate and aluminate tetrahedrals linked alternately by sharing all oxygens, with $Al^{3+}$ and $Si^{4+}$ in IV-fold coordination with oxygen. In embodiments, the geopolymer recipe/slurry/composition of this disclosure can be present in the treatment (e.g., cementing) fluid in any suitable concentration or loading.

Equation 1 below provides a geosynthesis reaction in accordance with certain embodiments of the present disclo-sure, which may not be representative of all geosynthesis reactions.

$$Al_2O_3 + SiO_2 + wH_2O \xrightarrow{MOH} M((-SiO_2)_z - AlO_2)_n + wH_2O \tag{I}$$

As depicted in Equation 1, in embodiments, aluminate, silicate, and metal hydroxide react to form the geopolymer. Further, in those embodiments, the metal hydroxide, MOH, may include group 1 and/or 2 hydroxides. In embodiments, suitable metal hydroxides can include, but are not limited to, potassium hydroxide, sodium hydroxide, and calcium hydroxide. In Equation 1, the degree of polymerization is denoted by n and the atomic ratio of Si to Al is denoted by z.

Equation 2 below illustrates an embodiment wherein the metal ion may act as a counter ion to counterbalance the negative charge of the aluminum metal.

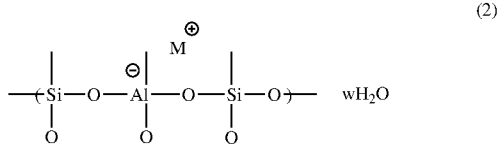

$$\tag{2}$$

Figure 2:
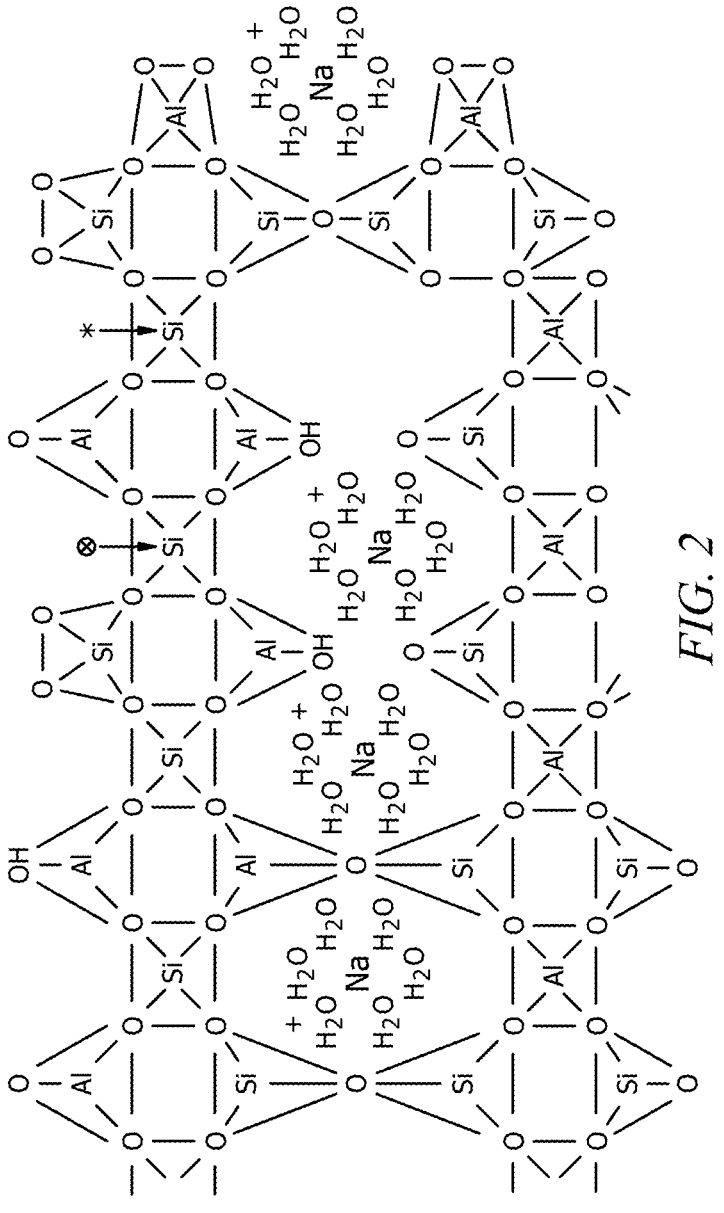
FIG. 2 is a diagram illustrating a geopolymer material that may be used in accordance with embodiments of the present disclosure.

FIG. 2 illustrates a three-dimensional structure of an exemplary embodiment of a geopolymer in accordance with the present disclosure. In embodiments, the geosynthesis reaction may be kinetically favored due to the presence of the counter anion. In embodiments, the metal hydroxide may act as an alkali activator for the geosynthesis reaction and as a stabilizing agent to the final polymer matrix. In embodi-ments, other compounds may act as alkali activators includ-ing, but not limited to, chloride salts such as KCl, $CaCl_2$, and NaCl, carbonates, such as $Na_2CO_3$, silicates, such as sodium silicate, aluminates, such as sodium aluminate, and ammo-nium hydroxide. In each case, the cation in the compound also may act as a counter anion. In embodiments, a metal hydroxide and salt may be used together. In embodiments, combinations of any salts, silicates, carbonates, aluminates, metal hydroxides, and ammonium hydroxide may act as an alkali activator. In embodiments, the alkali activator can be dry mixed with the other geopolymer components to make the geopolymer recipe/slurry/composition. In embodiments, the alkali activator may be in an aqueous solution. In certain embodiments, the alkali activator can be included in an amount in the range of from about 0.1% to about 50.0% by weight of the geopolymer recipe/slurry/composition. In other embodiments, the alkali activator can be included in an amount in the range of from about 1.0% to about 30.0% by weight of the geopolymer composition. In still other embodiments, the alkali activator can be included in an amount in the range of from about 5.0% to about 15.0% by weight of the geopolymer recipe/slurry/composition.

According to embodiments, the geopolymer cement reci-pes/slurries/compositions of this disclosure include an aluminosilicate that acts as a traditional geopolymer binder. The aluminosilicate can include any suitable aluminosilicate. In embodiments, the aluminosilicate can be or comprise a mineral including aluminum, silicon, and oxygen, plus counter-cations. In embodiments, the aluminosilicate source can be chosen based at least in part on the specific properties of the aluminosilicate. For example, some minerals such as andalusite, kyanite, and sillimanite are naturally occurring aluminosilicate sources that have the same composition, $Al_2SiO_5$, but differ in crystal structure. The differences in the crystal structure of the aluminosilicate may provide different properties. For example, due to the differing crystal structures, each of andalusite, kyanite, or sillimanite may react more or less quickly and to different extents at the same temperature and pressure. In embodiments, the final geopolymer created from any one aluminosilicate may have both microscopic and macroscopic differences such as mechanical strength and thermal resistivity owing to the different aluminosilicate sources. In embodiments, the aluminosilicate may include, but is not limited to, a metakaolin clay, a calcined clay, a partially calcined clay (such as metakaolin), a kaolinite clay, a lateritic clay, an illite clay, a volcanic rock (e.g., pumice, scoria), a mine tailing, blast furnace slag (e.g., granulated blast furnace slag, ground blast furnace slag), fly ash (e.g., coal fly ash, ASTM type C fly ash, ASTM type F fly ash), rice husk ash, aluminum-containing silica fume, natural aluminosilicate, synthetic aluminosilicate glass powder, zeolite, bentonite, a derivative thereof, or a combination thereof. The aluminosilicate source can be present in the geopolymer recipe/slurry/composition in an amount of about 5% to about 50% by weight of the geopolymer recipe/slurry/composition. In embodiments, the aluminosilicate source can be present in an amount in the range of from about from about 0.05% to about 80%, or from about 0.1% to about 70% by weight of the geopolymer recipe/slurry/composition. In embodiments, the aluminosilicate source can be present in an amount in the range of from about 1.0% to about 45.0% by weight of the geopolymer recipe/slurry/composition. In embodiments, the aluminosilicate source can be present in an amount in the range of from about 1.75% to about 40.0% by weight of the geopolymer recipe/slurry/composition.

As noted above, the geopolymer material can comprise a metal silicate. The metal silicate source may include any suitable metal silicate. A silicate may be any compound containing an anionic silicon compound. Some examples of a silicate include the orthosilicate anion also known as silicon tetroxide anion, $SiO_4^{4-}$ as well as hexafluorosilicate, $SiFe^{2-}$. In embodiments, the silicate may include cyclic and single chain silicates which may have the general formula $(SiO_3^{2-})_n$ and sheet-forming silicates which may have the general formula $(Si_2O_5^{2-})_n$. In embodiments, the silicate may have one or more metal cations associated with each silicate molecule. Some suitable metal silicate sources include sodium silicate, sodium metasilicate, magnesium silicate, potassium silicate, or a combination thereof. According to embodiments, the metal silicate source can be present in an amount in the range of from about 1% to about 80% by weight of the geopolymer recipe/slurry/composition, for example about 1% to about 10%, about 10% to about 20%, about 20% to about 30%, about 30% to about 40%, about 40% to about 50%, about 50% to about 60%, about 60% to about 70%, about 70% to about 80%, or about 40% to about 80% by weight of the geopolymer recipe/slurry/composition. In embodiments, the metal silicate source may be present in an amount in the range of from about 0.1% to about 50.0% by weight of the geopolymer recipe/slurry/composition. In embodiments, the metal silicate source may be present in an amount in the range of from about 0.3% to about 40.0% by weight of the geopolymer recipe/slurry/composition. In embodiments, the metal silicate source may be present in an amount in the range of from about 0.6% to about 30.0% by weight of the geopolymer recipe/slurry/composition.

As noted above, the geopolymer material can comprise an alkaline activator. The alkaline activator can comprise any suitable alkaline activator. According to embodiments, the alkaline activator includes hydroxides (e.g., metal hydroxides or ammonium hydroxide) or carbonates such as sodium carbonate ($Na_2CO_3$). According to embodiments, the alkaline activator includes any of a variety of suitable hydroxide sources that are capable of generating hydroxyl groups (OH) when dissolved in water. Examples of suitable hydroxide sources include metal hydroxide (e.g., sodium hydroxide), ammonium hydroxide, sodium bicarbonate, sodium carbonate, lime (e.g., hydrated lime), caustic soda, Portland cement, or a combination thereof. In embodiments, the alkali activator can comprise a metal hydroxide. In embodiments, the metal hydroxide comprises sodium hydroxide, ammonium hydroxide, potassium hydroxide, or a combination thereof. According to embodiments, the alkaline activator is present in an amount in the range of from about 1% to about 40% by weight of the geopolymer cement recipe/slurry/composition, for example about 1% to about 5%, about 5% to about 10%, about 10% to about 15%, about 15% to about 20%, about 10% to about 20%, or about 20% to about 40% by weight of the geopolymer cement recipe/slurry/composition.

As noted above, the geopolymer material can comprise water. The water can comprise any suitable source of water. In embodiments, the water may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the geopolymer cement slurries/compositions. The water may be included in an amount sufficient to form a pumpable slurry. The water may be included in the geopolymer cement recipes/slurries/compositions in any suitable range, including, but not limited to, in the range of about 40% to about 200% by weight of the cement component or components ("bwoc"). By weight of cement refers to the total weight of all cement components included in the cement slurry. In some examples, the water may be included in an amount in the range of about 40% to about 150% bwoc. The water can be present in the geopolymer recipe/slurry/composition in an amount of about 20% to about 95% by weight of the geopolymer recipe/slurry/composition, for example about 60% to about 90% by weight of the geopolymer cement slurry/composition.

In embodiments, the aluminosilicate source is present (e.g., in the geopolymer recipe/slurry/composition) in an amount of from about 5% to about 80%, from about 0.05% to about 80%, or from about 0.1% to about 75%, by weight of the geopolymer recipe, geopolymer slurry, and/or geopolymer composition, the metal silicate source is present in an amount of about 1% to about 80%, from about 1% to about 75%, or from about 2% to about 80%, by weight of the geopolymer recipe, geopolymer slurry, and/or geopolymer composition, the alkaline activator is present in an amount of from about 1% to about 40%, from about 2% to about 35%, or from about 1% to about 35%, by weight of the geopolymer recipe, geopolymer slurry, and/or geopolymer composition, and the water is present in an amount of from about 15% to about 95%, from about 10% to about 90%, or from about 15% to about 90%, by weight of the geopolymer recipe, geopolymer slurry, and/or geopolymer composition. According to example embodiments, the metal silicate source includes sodium silicate, the alkaline activator includes a metal hydroxide, and the carrier fluid includes water.

The geopolymer recipe/slurry/composition can further comprise one or more of a fluid loss control additive, a set retarder, or a set accelerator.

According to embodiments, the geopolymer cement recipes/slurries/compositions further include a fluid loss control additive. As used herein, the term "fluid loss control additive" refers to an additive that is used to decrease the volume of fluid that is lost to the subterranean formation. Examples of suitable fluid loss control additives include, but are not limited to, certain polymers, such as hydroxyethyl cellulose, carboxymethylhydroxyethyl cellulose, copolymers of 2-acrylamido-2-methylpropanesulfonic acid and acrylamide or N,N dimethylacrylamide, and graft copolymers including a backbone of lignin or lignite and pendant groups including at least one member selected from 2-acrylamido-2-methyl-propanesulfonic acid, acrylonitrile, and N,N-dimethylacry-lamide. According to embodiments, the fluid loss control additive, when present, is present in an amount in the range of from about 0.1% to about 5% by weight of the geopolymer cement recipe/slurry/composition. Thus, in embodiments, the geopolymer recipe/slurry/composition comprises a fluid loss control additive, and the fluid loss control additive is present in an amount of from about 0.1% to about 5%, from about 0.5% to about 5%, or from about 0.1% to about 3%, by weight of the geopolymer recipe/slurry/composition.

According to embodiments, the geopolymer cement recipes/slurries/compositions further include a set retarder. As used herein, the term "set retarder" refers to an additive that is used to increase the thickening time of cement composi-tions. Without intending to be limited to any theory or mechanism, the set retarder may act to inhibit the consoli-dation of the geopolymer recipe/slurry/composition. Examples of suitable set retarders include, but are not limited to, ammonium, alkali metals, alkaline earth metals, metal salts of sulfoalkylated lignins, hydroxycarboxy acids, copolymers of 2-acrylamido-2-methylpropane sulfonic acid salt and acrylic acid or maleic acid, or a combination thereof. One example of a suitable sulfoalkylated lignin includes a sulfomethylated lignin. In embodiments, the set retarder can include phosphonic acid, phosphonic acid derivatives, ligno-sulfonates, salts, organic acids, carboxymethylated hydroxy-ethylated celluloses, synthetic co- or ter-polymers including sulfonate and carboxylic acid groups, borate compounds, derivatives thereof, or any mixture thereof. In embodiments, the set retarders used in the geopolymer recipes/slurries/compositions of the present disclosure may be phosphonic acid derivatives. According to embodiments, the set retarder, when present, is present in an amount in the range of from about 0.1% to about 5% by weight of the geopolymer cement recipe/slurry/composition. In embodiments, the set retarder may be present in the geopolymer recipes/slurries/compositions in an amount in the range of from about 0.01% to about 10.0% by weight thereof. In embodiments, the set retarder may be present in the set-delayed geopolymer recipes/slurries/compositions in an amount in the range of from about 0.1% to about 8.0% by weight thereof. In embodiments, the set retarder may be present in the geopolymer recipes/slurries/compositions in an amount in the range of from about 0.25% to about 5.0% by weight of the geopolymer recipe/slurry/composition. In embodiments, the set retarder may be present in the geopolymer recipes/slurries/compositions in an amount in the range of from about 0.1% to about 5% by weight of the geopolymer recipe/slurry/composition. One of ordinary skill in the art, with the benefit of this disclosure, will recognize the appro-priate amount of the set retarder to include for a chosen application. However, in some embodiments, the geopoly-mer recipes/slurries/compositions of the present disclosure may be substantially, or entirely, free of any set retarder additive (other than the geopolymer composition).

In embodiments, an accelerator may be added to the geopolymer recipes/slurries/compositions of the present dis-closure to increase the rate of setting of the geopolymer recipes/slurries/compositions. In other words, the accelera-tor may increase the rate at which compressive strength develops. Control of setting time may allow for the ability to adjust to wellbore conditions or customize set times for individual jobs. In embodiments, suitable cement set accel-erators include, but are not limited to, calcium chloride, triethanolamine, sodium silicate, zinc formate, calcium acetate, sodium hydroxide, sodium sulfate, and combina-tions thereof. In embodiments, set accelerators may include, but are not limited to, one or more of: aluminum sulfate, alums, calcium chloride, calcium sulfate, gypsum-hemihy-drate, sodium aluminate, sodium carbonate, sodium chlo-ride, sodium silicate, sodium sulfate, ferric chloride, or a combination thereof. In embodiments, the cement set accel-erator may be added to embodiments of the geopolymer cement recipe/slurry/composition in an amount sufficient to activate the geopolymer composition to at least partially consolidate into a hardened mass. In embodiments, the cement set accelerator may be added to the geopolymer cement recipe/slurry/composition in an amount in the range of about 0.1% to about 50.0% by weight thereof. In embodi-ments, the cement set accelerator may be added to the geopolymer cement recipe/slurry/composition in an amount in the range of about 1.0% to about 30.0% by weight thereof. In embodiments, the cement set accelerator may be added to the geopolymer cement recipe/slurry/composition in an amount in the range of about 5.0% to about 50.0% by weight thereof. In embodiments, the cement set accelerator may be added to the geopolymer cement recipe/slurry/composition in an amount in the range of about 0.1% to about 20.0% by weight of the geopolymer cement recipe/slurry/composition. One of ordinary skill in the art, with the benefit of this disclosure, will recognize the appropriate amount of the cement set accelerator to include for a chosen application.

According to embodiments, other additives (e.g., suitable for use in subterranean cementing operations) are optionally added to the geopolymer cement recipes/slurries/composi-tions. Other additives suitable for use in subterranean cementing operations also may be included in embodiments of the geopolymer cement compositions. Examples of such additives include, but are not limited to, strength retrogres-sion additives, set accelerators, retarders, weighting agents, lightweight additives, gas generating additives, gas control additives, activators, mechanical property enhancing addi-tives, lost circulation materials, filtration control additives, foaming additives, defoaming agents, fluid-loss control additives, thixotropic additives, suspending agents, disper-sants, or a combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, or a combination thereof. In embodiments, the treatment fluids (e.g., geopolymer cement compositions/slurries) of the present disclosure optionally may include one or more additional additives selected from: resins; latex; stabilizers; silica; pozzolans; microspheres; aqueous superabsorbers; viscosifying agents; suspending agents; dispersing agents; salts; accelerants; surfactants; retardants; foamers, defoamers; settling-prevention agents; weighting agents; fluid loss control agents; elastomers; vitrified shale; gas migration control additives; formation conditioning agents; or combinations thereof. In embodiments, the treatment fluid may contain rheology (viscosity and gel strength) modifiers and/or stabilizers. A person skilled in the art, with the benefit of this disclosure, will be able to determine the type and amount of additive useful for a particular application and desired result.

The tailored geopolymer cement recipes/slurries/compositions of this disclosure may include slag. Slag is generally a by-product in the production of various metals from their corresponding ores. By way of example, the production of cast iron can produce slag as a granulated, blast furnace by-product with the slag generally including the oxidized impurities found in iron ore. Slag generally does not contain sufficient basic material, so slag cement may be used that further may comprise a base to produce a settable composition that may react with water to set to form a hardened mass. Examples of suitable sources of bases include, but are not limited to, sodium hydroxide, sodium bicarbonate, sodium carbonate, lime, and combinations thereof. The slag may be present in the geopolymer cement slurries/compositions in any suitable amount, including, but not limited to an amount in the range of about 0% to about 99% bwoc. In some examples the slag may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of slag for a particular application.

The tailored geopolymer recipes/slurries/compositions of this disclosure may include cement kin dust or "CKD." CKD refers to a partially calcined kiln feed which is removed from the gas stream and collected, for example, in a dust collector during the manufacture of cement. The CKD may be present in the geopolymer recipes/slurries/compositions in any suitable amount, including, but not limited to an amount in the range of about 0% to about 99% bwoc. In some examples the CKD may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of CKD for a particular application.

The tailored geopolymer recipes/slurries/compositions of this disclosure may include minerals such as natural glasses. Natural glasses may be present in the geopolymer recipes/slurries/compositions in any suitable amount, including, but not limited to an amount in the range of about 0% to about 99% bwoc. In some examples the natural glasses may be present in an amount ranging between any of and/or including any of about 1%, about 5%, about 10%, about 20%, about 40%, about 60%, about 80%, or about 90% bwoc. Those of ordinary skill in the art, with the benefit of this disclosure, should be able to select an appropriate amount of natural glass for a particular application.

Clays may be included in the tailored geopolymer recipes/slurries/compositions of this disclosure. Some clays may include shale or metakaolin. A variety of clays are suitable, including those including silicon, aluminum, calcium, and/or magnesium. An example of a suitable shale comprises vitrified shale. Zeolites may also be included in the cement slurries. Zeolites generally are porous alumino-silicate minerals that may be either a natural or synthetic material. Synthetic zeolites are based on the same type of structural cell as natural zeolites and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples including zeolite may comprise zeolite in combination with a cation such as $Na^+$, $K^+$, $Ca^{2+}$, $Mg^{2+}$, etc. Zeolites including cations such as sodium may also provide additional cation sources to the cement slurry as the zeolites dissolve. The clays and zeolites may be present in the geopolymer recipes/slurries/compositions in any suitable amount, including, but not limited to an amount in the range of about 0% to about 99% bwoc. In some examples the clays and zeolites may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of clays and/or zeolite for a particular application.

In embodiments, the geopolymer cement recipes/slurries/compositions may further include a lightweight additive. The lightweight additive may be included to reduce the density of embodiments of the geopolymer cement slurries/compositions according to the geopolymer recipes. For example, the lightweight additive may be used to form a lightweight cementing fluid having a density of less than about 13 $lb_m$/gal. The lightweight additive typically may have a specific gravity of less than about 2.0. Examples of suitable lightweight additives may include, but are not limited to hollow microspheres, gilsonite, perlite, or any combinations thereof. In embodiments, the lightweight additive may be present in an amount of from about 0.1% to about 30% by weight of dry solids. In embodiments, the lightweight additive may be present in an amount of from about 1% to about 15% by weight of dry solids. In certain embodiments, the lightweight additive may be present in an amount from about 0.01% by weight of a weighting agent in the cementing fluid to about 10% by weight of a weighting agent.

In embodiments, the geopolymer cement recipes/slurries/compositions of the present disclosure may include lost circulation materials or bridging agents. In embodiments, lost circulation materials may include, but are not limited to, resilient graphitic carbon, ground walnut shells, calcium carbonate and polymers, and the like, or a combination thereof. In embodiments, the cementing fluid (e.g., geopolymer composition/slurry) does not include a lost circulation material. In embodiments, the geopolymer cementing fluid does not include a bridging agent. In embodiments, the cementing fluid is free or substantially free of particulates.

In embodiments, the geopolymer cement recipes/slurries/compositions of the present disclosure may include a weighting agent. Examples of suitable solid weighting agents include, but are not limited to barite, hematite, calcium carbonate, magnesium carbonate, iron carbonate, zinc carbonate, manganese tetraoxide, ilmenite, or a combination thereof. The weighting agents may be at least partially soluble or insoluble in the cementing fluid. In embodiments, a weighting agent may be present in the geopolymer compositions in an amount of from about 1% to about 60% by weight of the cementing fluid. In embodiments, the weighting agents may be present in the geopolymer cement compositions in an amount of from about 1% to about 35% by weight of the cementing fluid. In embodiments, the weighting agent may be present in the geopolymer cement compositions in an amount of from about 1% to about 10% by weight of the geopolymer cementing fluid. Alternatively, the amount of weighting agent may be expressed by weight of dry solids. For example, the weighting agent may be present in an amount of from about 1% to about 99% by weight of dry solids. In embodiments, the weighting agent may be present in an amount of from about 1% to about 20% and, alternatively, from about 1% to about 10% by weight of dry solids.

In embodiments, the geopolymer cement recipes/slurries/compositions may further include a free water control additive. As used herein, the term "free water control additive" refers to an additive included in a liquid for, among other things, reducing (or preventing) the presence of free water in the liquid. Free water control additives also may reduce (or prevent) the settling of solids. Examples of free water control additives suitable for certain embodiments of the present disclosure include, but are not limited to, bentonite, amorphous silica, hydroxyethyl cellulose, or a combination thereof. The free water control additive may be provided as a dry solid in embodiments. In embodiments, the free water control additive may be present in an amount of from about 0.1% to about 16% by weight of a weighting agent in the cementing fluid (e.g., geopolymer slurry/composition). In embodiments, the free water control additive may be present in an amount of from about 0.1% to about 2% by weight of the weighting agent. In embodiments, the free water control additive may be present in the cementing fluid in an amount from about 0.2 $lb_m$/bbl to about 10 $lb_m$/bbl.

The geopolymer recipe, geopolymer slurry, and/or geopolymer composition can have a compressive strength in a range of from about 50 psi to about 10,000 psi, from about 100 to about 5,000 psi, or from about 100 to about 10,000 psi, after curing at 140° F. for about 7 days.

As noted herein, the geopolymer recipe/slurry/composition can be any geopolymer recipe/slurry/composition, determined as described herein (via modeling) to meet the requirements for a given application (e.g., to provide a requisite compressive strength).

In embodiments, for example, the geopolymer recipe/slurry/composition can be a set-delayed geopolymer recipe/slurry/composition, such as described in U.S. Pat. No. 11,242,479, the disclosure of which is hereby incorporated herein in its entirety for purposes not contrary to this disclosure. Such a set-delayed geopolymer cement recipe/slurry/composition can further comprise a set retarder. In such embodiments, the method can further include mixing a slurry activator into the set-delayed geopolymer cement recipe/slurry/composition to activate the set-delayed geopolymer cement composition. The slurry activator can comprise, for example, water and hydrated lime. In embodiments, the slurry activator can further comprise a dispersant. In such embodiments, the geopolymer material and the hydrated lime can be present in a weight ratio of geopolymer material to hydrated lime of about 38:1 to about 48:1. The set-delayed geopolymer cement recipe/slurry/composition can remain in a pumpable fluid state for at least about 1 day or more prior to mixing the slurry activator therewith. The set-delayed geopolymer cement recipe/slurry/composition can further comprise at least one additive selected from a weighting agent, a gas-generating additive, a lost-circulation material, or a combination thereof. The set-delayed geopolymer cement recipe/slurry/composition can set after mixing the slurry activator into the set-delayed geopolymer cement recipe/slurry/composition to develop a 24-hour compressive strength of at least about 50, 500, 1000, 5000, or 10000 psi as measured using a destructive crush test at 140° F. (60° C.).

In embodiments, the geopolymer recipe/slurry/composition is a geopolymer lost circulation material, such as described, for example, in U.S. Pat. No. 11,162,015, the disclosure of which is hereby incorporated herein in its entirety for purposes not contrary to this disclosure.

Generally, geopolymer cement compositions are more flexible than typical oil-well cement compositions because many different materials can be used as geopolymer binders. For example, the binders can be locally sourced materials, low cost materials, and/or specialized materials such as fly ash, slag, cement kiln dust, metakaolin, clays, volcanic glasses, waste materials, bio-ashes, or other types of aluminosilicates. In embodiments, the geopolymer recipe/slurry/composition is a geopolymer cement composition comprising a disparate binder, such as a monophase amorphous hydraulic binder material (MAHBM), such as described, for example, in U.S. Pat. No. 11,692,122, the disclosure of which is hereby incorporated herein in its entirety for purposes not contrary to this disclosure.

In embodiments, the components of the geopolymer recipe/slurry/composition may be combined in any order desired to form a geopolymer composition that can be placed into a subterranean formation or used as a component of a sealing (e.g., cementing) fluid. In embodiments, the components of the geopolymer recipes/slurries/compositions may be combined using any mixing device compatible with the recipe/slurry/composition, including a bulk mixer, for example. In embodiments, a geopolymer recipe/slurry/composition may be formed by dry blending dry components including the aluminosilicate source, the metal silicate source, and an alkali activator. In embodiments, the dry blend of the geopolymer recipe/slurry/composition may then be combined with water (e.g., tap water, seawater, saltwater, etc.) to form a geopolymer slurry/composition according to the geopolymer recipe, which may be included in a (e.g., wellbore) treatment (e.g., cementing) fluid. In other embodiments, a dry blend of the geopolymer recipe/slurry/composition may be combined directly with other components of a cementing fluid to form the geopolymer treatment (e.g., cementing) fluid. Thus, according to embodiments, the components of the geopolymer cement slurries/compositions according to the geopolymer recipes may be combined in any order desired to form a geopolymer cement slurry/composition that can be placed into a subterranean formation. In addition, the components of the geopolymer cement slurries/compositions may be combined using any mixing device compatible with the composition, including a bulk mixer, for example. According to embodiments, a dry blend may first be formed by dry blending the dry components of the geopolymer cement recipe/slurry/composition. The dry blend may then be combined with the carrier fluid/water to form the geopolymer cement slurry composition. Other suitable techniques may be used for preparation of the geopolymer cement slurries/compositions as will be appreciated by those of ordinary skill in the art with the benefit of the present disclosure.

Those of ordinary skill in the art will appreciate that embodiments of the geopolymer recipes/slurries/compositions of the present disclosure generally should have a density suitable for a particular application. For example, in embodiments, the geopolymer recipe, geopolymer slurry, and/or geopolymer composition can have any suitable density, including, but not limited to, a density in a range of from about 8 pounds per gallon ("ppg" or "lb$_m$/gal") (959 kg/m$^3$) to about 20 ppg (2397 kg/m$^3$), from about 10 pounds per gallon (ppg) to about 12.6 ppg, from about 4 ppg to about 25 ppg, from about 10 ppg to about 18 ppg, or from about 12 ppg to about 16 ppg. In some embodiments, the geopolymer recipes/slurries/compositions may include a means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

In embodiments, the geopolymer recipes/slurries/compositions may exhibit a delayed set in that they remain in a pumpable fluid state for an extended period of time. In embodiments, the set-delayed geopolymer recipes/slurries/compositions may remain in a pumpable fluid state for a period of time from about 1 days to about 60 days or more. In embodiments, the set-delayed geopolymer recipes/slurries/compositions may remain in a pumpable fluid state for a period of time from about 1 days to about 21 days or more. In embodiments, the set-delayed geopolymer recipes/slurries/compositions may remain in a pumpable fluid state for a period of time from about 1 days to about 14 days or more. A fluid may be considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, Recommended Practice for Testing Well Cements, First Edition, July 2005.

In embodiments, the geopolymer recipes/slurries/compositions may set to form a hardened mass in a time period ranging between any of and/or including any of about 8 hours, about 12 hours, less than about 24 hours, about 1 day, about 2 days, about 4 days, about 6 days, about 8 days, about 10 days, or about 12 days.

In embodiments, the geopolymer cement recipes/slurries/compositions may form a hardened mass in a time period in the range of from about 0.50 hours to about 72.0 hours. In other embodiments, the geopolymer cement recipes/slurries/compositions may form a hardened mass in a time period in the range of from about 2.0 hours to about 24.0 hours. In still other embodiments, the geopolymer cement recipes/slurries/compositions may form a hardened mass in a time period in the range of from about 4.0 hours to about 12.0 hours. In embodiments, the geopolymer cement recipe/slurry/composition may develop a 24-hour compressive strength in the range of from about 25.0 psi to about 5000.0 psi. In embodiments, the geopolymer cement recipe/slurry/composition may develop a 24-hour compressive strength in the range of from about 50.0 psi to about 3000.0 psi. In embodiments, the geopolymer cement recipe/slurry/composition may develop a 24-hour compressive strength in the range of from about 100.0 psi to about 2000.0 psi. The compressive strengths may be determined in accordance with API RP 10B-2, Recommended Practice for Testing Well Cements, First Edition, July 2005, using an UCA at 140° F. while maintained at 3000 psi.

As will be appreciated by those of ordinary skill in the art, embodiments of the geopolymer cement recipes/slurries/compositions of the present disclosure may be used in a variety of subterranean operations, including primary and remedial cementing. In embodiments, the geopolymer recipe/slurry/composition may be introduced into a subterranean formation and allowed to at least partially consolidate therein. As used herein, introducing the geopolymer recipe/slurry/composition into a subterranean formation includes introduction into any portion of the subterranean formation, including, without limitation, into a wellbore drilled into the subterranean formation, into a near wellbore region surrounding the wellbore, or into both. Embodiments of the present disclosure may further include activation of a set-delayed geopolymer recipe/slurry/composition. The activation of the set-delayed geopolymer cement recipe/slurry/composition may include, for example, addition of a cement set accelerator, such as described herein, to the set-delayed geopolymer cement recipe/slurry/composition.

In some embodiments, a set-delayed geopolymer cement recipe/slurry/composition may be provided. The set-delayed geopolymer cement recipe/slurry/composition may be stored, for example, in a vessel or other suitable container. In embodiments, the set-delayed geopolymer cement recipe/slurry/composition may be permitted to remain in storage for a desired time period. In embodiments, the set-delayed geopolymer cement recipe/slurry/composition may remain in storage for a time period of about 1 day or longer. For example, the set-delayed geopolymer cement recipe/slurry/composition may remain in storage for a time period of about 1 day, about 2 days, about 5 days, about 7 days, about 10 days, about 20 days, about 30 days, about 40 days, about 50 days, about 60 clays, or longer. In embodiments, the set-delayed geopolymer cement recipe/slurry/composition may remain in storage for a time period in a range of from about 1 day to about 7 days or longer. Thereafter, the set-delayed geopolymer cement recipe/slurry/composition may be activated, for example, by addition of a cement set accelerator, introduced into a subterranean formation, and allowed to set therein.

As noted herein, the method of this disclosure can comprise utilizing the geopolymer composition 40. Utilizing the geopolymer composition can comprise introducing the geopolymer composition into a subterranean formation by introducing the geopolymer composition into an annulus between a wall of a wellbore and a conduit disposed in the wellbore, as discussed further hereinbelow with reference to FIG. 3, FIG. 4A, and FIG. 4B. The cement slurries disclosed herein may be utilized in a variety of subterranean applications, including primary and remedial cementing. The cement slurries may be introduced into a subterranean formation and allowed to set. In primary cementing embodiments, for example, embodiments of the geopolymer recipe/slurry/composition may be introduced into the annular space between a conduit (e.g., pipe strings, liners) located in a wellbore and the walls of the wellbore (and/or a larger conduit in the wellbore), wherein the wellbore penetrates the subterranean formation. The geopolymer cement recipe/slurry/composition may be allowed to set to form an annular sheath of hardened cement in the space between the wellbore wall and the conduit. Among other things, the set geopolymer cement recipe/slurry/composition may form a barrier, preventing the migration of fluids in the wellbore. The set geopolymer slurry/composition according to the geothermal recipe also may, for example, support the conduit in the wellbore.

In remedial cementing embodiments, a geopolymer cement slurry/composition according to the geopolymer recipe may be used, for example, in squeeze-cementing operations or in the placement of cement plugs. By way of example, the geopolymer slurry/composition according to the geopolymer recipe may be placed in a wellbore to plug an opening, such as a void or crack, in the formation, in a gravel pack, in the conduit, in the cement sheath, and/or a microannulus between the cement sheath and the conduit. Geopolymer cement slurries/compositions also may be used in surface applications.

Certain components of the cementing fluid may be provided as a "dry mix" to be combined with the base fluid and/or other components prior to or during introducing the sealing/cementing fluid into the subterranean formation. In embodiments, dry mix compositions may be designed to include a base fluid in an amount from about 1 to about 20 gallons per 94-1b sack of dry blend (gal/sk). In embodiments, dry mix compositions may be suitable for base fluids in the amount of 10 gal/sk. In embodiments, dry mix compositions may be suitable for base fluids in the amount of 13.5 gal/sk. Embodiments of the geopolymer sealant/cement slurries/compositions of the present disclosure may be prepared in accordance with any suitable technique. In embodiments, the desired quantity of water may be introduced into a mixer (e.g., a cement blender) followed by the dry blend. The dry blend may include the geopolymer materials and additional solid additives, for example. Additional liquid additives, if any, may be added to the water as desired prior to, or after, combination with the dry blend. This mixture may be agitated for a sufficient period of time to form a slurry. It will be appreciated by those of ordinary skill in the art, with the benefit of this disclosure, other suitable techniques for preparing geopolymer cement slurries/compositions according to the geopolymer recipes may be used in accordance with embodiments of the present disclosure.

In embodiments, the geopolymer cement recipes/slurries/compositions of the present disclosure may be suitable for use at a variety of temperatures, pH levels, water salinities, and mineralogies of subterranean formations. In embodiments, the materials that make up the geopolymer cement recipes/slurries/compositions function at temperatures above 400° F. (204.4° C.) and thus the behavior of the compositions is likely to be unaffected at temperatures above 400° F. (204.4° C.). Thus, in embodiments, the geopolymer cement recipes/slurries/compositions may provide effective fluid displacement, loss zone treatment, or both, even when used in conditions at or above 400° F. (204.4° C.). Moreover, the properties of geopolymer cement slurries/compositions according to the geopolymer recipes may be effective over a range of pH levels. For example, in embodiments, the geopolymer cement recipes/slurries/compositions may provide effective fluid displacement and loss zone treatment from a pH of about 7 to about 12. Additionally, the geopolymer cement recipes/slurries/compositions of the present disclosure may be suitable for a variety of subterranean formations, including, but not limited to shale formations and carbonate formations.

According to embodiments, the geopolymer cement slurries/compositions according to the recipes meeting the compressive strength criteria may be used in a variety of cementing operations, including surface and subterranean operations, such as primary and remedial cementing. According to embodiments, the geopolymer cement slurries/compositions are introduced into a subterranean formation and allowed to set therein. The term "introducing" or its variations, as used herein, includes pumping, injecting, pouring, releasing, displacing, spotting, circulating, or otherwise placing a fluid or material within a well, wellbore, or subterranean formation using any suitable manner known in the art. According to embodiments, introducing the geopolymer cement slurry/composition into a subterranean formation includes introduction into any portion of the subterranean formation, including, without limitation, into a wellbore drilled into the subterranean formation, into a near wellbore region surrounding the wellbore, or into both.

Figure 3:
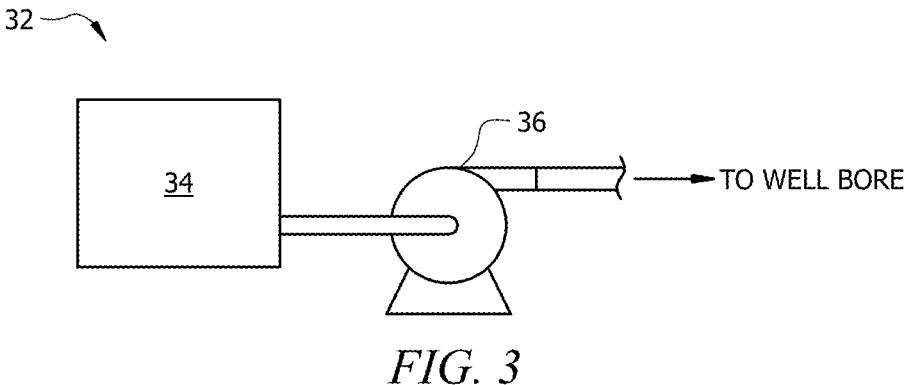
FIG. 3 is a schematic representation of a system that may be used in the preparation of a geopolymer cement slurry/composition in accordance with embodiments of the present disclosure.

Referring now to FIG. 3, a system that may be used in the preparation of a geopolymer recipe/slurry/composition in accordance with example embodiments will now be described. FIG. 3 illustrates a system 32 for preparation of a geopolymer slurry/composition according to the geopolymer recipe and delivery to a wellbore in accordance with embodiments of this disclosure. As shown, the geopolymer slurry/composition may be mixed in mixing equipment 34, such as a jet mixer, re-circulating mixer, or a batch mixer, for example, and then pumped via pumping equipment 36 to the wellbore. In embodiments, the mixing equipment 34 and the pumping equipment 36 may be disposed on one or more cement trucks, as will be apparent to those of ordinary skill in the art. In embodiments, a jet mixer may be used, for example, to continuously mix the geopolymer slurry/composition, including water, as it is being pumped to the wellbore.

Figure 4A:
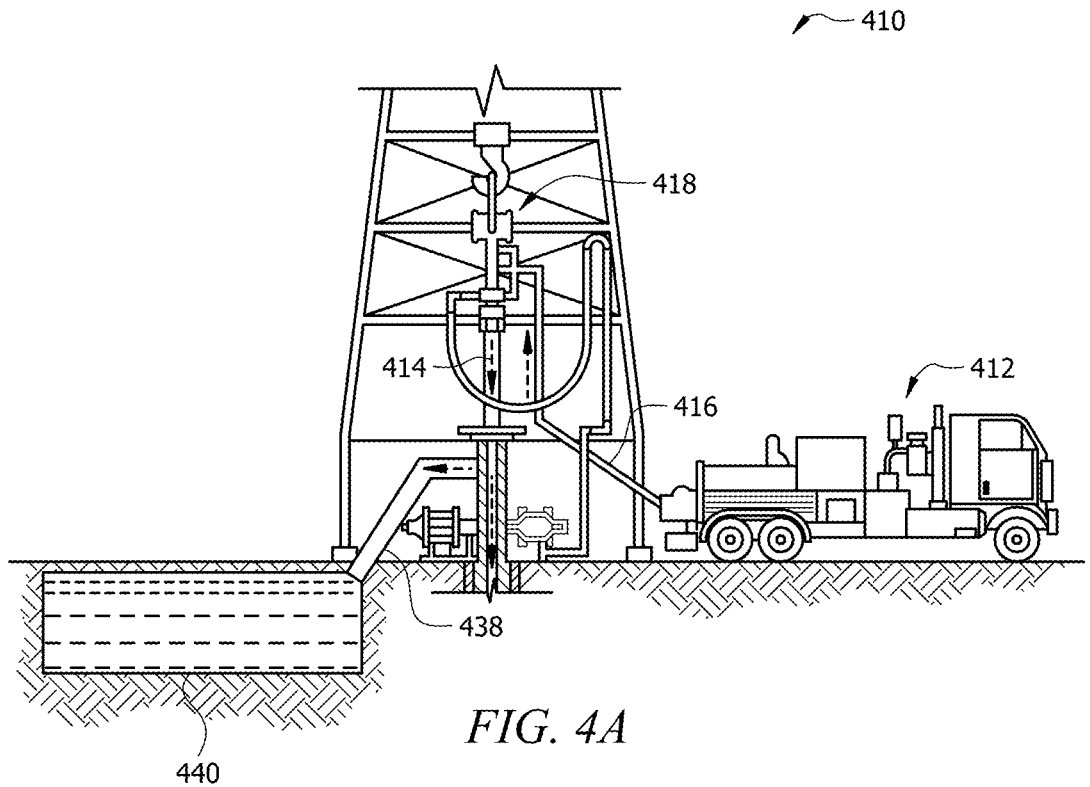
FIG. 4A is a schematic representation of surface equipment that may be used in placement of a geopolymer cement slurry/composition in accordance with embodiments of the present disclosure.

An example technique and system for placing a geopolymer slurry/composition into a subterranean formation will now be described with reference to FIG. 4A and FIG. 4B. FIG. 4A illustrates surface equipment 410 that may be used in placement of a geopolymer slurry/composition in accordance with embodiments. It should be noted that while FIG. 4A generally depicts a land-based operation, those skilled in the art will readily recognize that the principles described herein are equally applicable to subsea operations that employ floating or sea-based platforms and rigs, without departing from the scope of the disclosure. As illustrated by FIG. 4A, the surface equipment 410 may include a cementing unit 412, which may include one or more cement trucks. The cementing unit 412 may include mixing equipment 34 and pumping equipment 36 (e.g., FIG. 3) as will be apparent to those of ordinary skill in the art. However, in embodiments, the geopolymer slurries/compositions of the present disclosure may be mixed prior to delivery to the wellbore operation. In embodiments where the cement composition is mixed prior to delivery to the wellbore operation, the footprint of the operation equipment may be reduced. The cementing unit 412 may pump a cement composition 414 through a feed pipe 416 and to a cementing head 418 which conveys the cement composition 414 downhole. Surface equipment 410 may include one or more retention pits 440 (e.g., a mud pit) connected to the wellbore via a flow line 438.

Figure 4B:
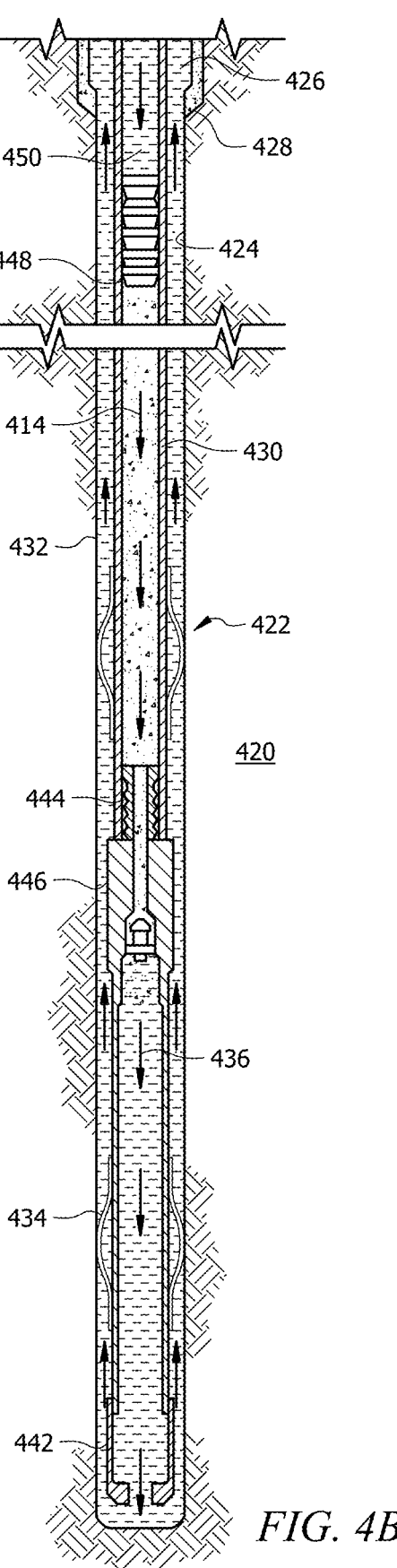
FIG. 4B is a schematic representation of downhole equipment that may be used in placement of a geopolymer cement slurry/composition in accordance with embodiments of the present disclosure.

Turning now to FIG. 4B, the cement composition 414 may be placed into a subterranean formation 420 in accordance with example embodiments. As illustrated, a wellbore 422 may be drilled into the subterranean formation 420. While wellbore 422 is shown extending generally vertically into the subterranean formation 420, the principles described herein are also applicable to wellbores that extend at an angle through the subterranean formation 420, such as horizontal and slanted wellbores. As illustrated, the wellbore 422 includes walls 424. In the illustrated embodiments, a surface casing 426 has been inserted into the wellbore 422. The surface casing 426 may be cemented to the walls 424 of the wellbore 422 by cement sheath 428. In the illustrated embodiment, one or more additional conduits (e.g., intermediate casing, production casing, liners, etc.) shown here as casing 430 also may be disposed in the wellbore 422. As illustrated, there is a wellbore annulus 432 formed between the casing 430 and the walls 424 of the wellbore 422 and/or the surface casing 426. One or more centralizers 434 may be attached to the casing 430, for example, to centralize the casing 430 in the wellbore 422 prior to and during the cementing operation.

With continued reference to FIG. 4B, the geopolymer slurry/composition 414 may be pumped down the interior of the casing 430. The geopolymer slurry/composition 414 may be allowed to flow down the interior of the casing 430 through the casing shoe 442 at the bottom of the casing 430 and up around the casing 430 into the wellbore annulus 432. The geopolymer slurry/composition 414 may be allowed to set in the wellbore annulus 432, for example, to form a cement sheath that supports and positions the casing 430 in the wellbore 242. While not illustrated, other techniques also may be utilized for introduction of the geopolymer slurry/composition 414. By way of example, reverse circulation techniques may be used that include introducing the geopolymer slurry/composition 414 into the subterranean formation 420 by way of the wellbore annulus 432 instead of through the casing 430.

As it is introduced, the geopolymer slurry/composition 414 may displace other fluids 436, such as drilling fluids and/or spacer fluids, that may be present in the interior of the casing 430 and/or the wellbore annulus 432. At least a portion of the displaced fluids 36 may exit the wellbore annulus 432 via a flow line 438 and be deposited, for example, in one or more retention pits 440 (e.g., a mud pit), as shown on FIG. 4A. Referring again to FIG. 4B, a bottom plug 444 may be introduced into the wellbore 422 ahead of the geopolymer slurry/composition 414, for example, to separate the geopolymer slurry/composition 414 from the fluids 436 that may be inside the casing 430 prior to cementing. After the bottom plug 444 reaches the landing collar 446, a diaphragm or other suitable device can rupture to allow the geopolymer slurry/composition 414 through the bottom plug 444. In FIG. 4B, the bottom plug 444 is shown on the landing collar 446. In the illustrated embodiment, a top plug 448 may be introduced into the wellbore 422 behind the geopolymer slurry/composition 414. The top plug 448 may separate the geopolymer slurry/composition 414 from a displacement fluid 450 and also push the geopolymer slurry/composition 414 through the bottom plug 444.

To facilitate a better understanding of the present disclosure, the following examples of certain aspects of certain embodiments are given. The following examples are not the only examples that could be given according to the present disclosure and are not intended to limit the scope of the disclosure or claims.

Figure 5:
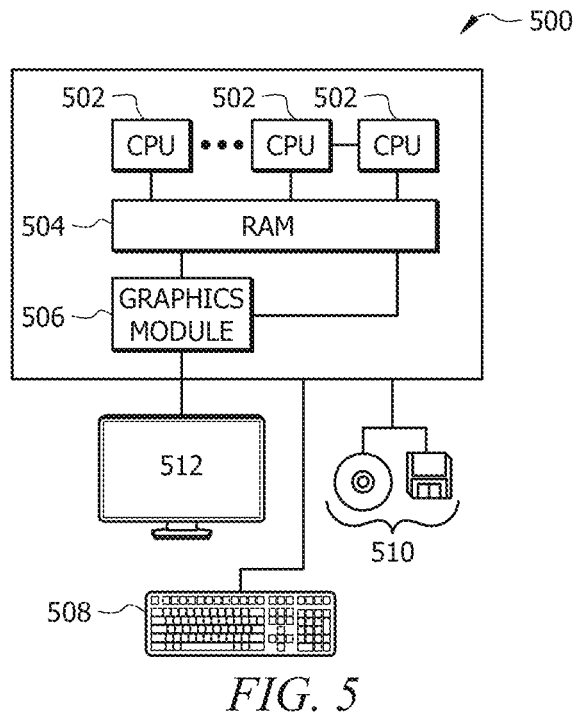
FIG. 5 is a schematic illustration of an example of an information handling system, according to embodiments of this disclosure.

FIG. 5 generally illustrates an example of an information handling system 800 that may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 500 may be a personal computer, a network storage device, or any other suitable device and may vary in size, shape, performance, functionality, and price. In examples, information handling system 500 may be referred to as a supercomputer or a graphics supercomputer.

As illustrated, information handling system 500 may include one or more central processing units (CPU) or processors 502. Information handling system 500 may also include a random-access memory (RAM) 504 that may be accessed by processors 502. It should be noted information handling system 500 may further include hardware or software logic, ROM, and/or any other type of nonvolatile memory. Information handling system 500 may include one or more graphics modules 506 that may access RAM 504. Graphics modules 506 may execute the functions carried out by a Graphics Processing Module (not illustrated), using hardware (such as specialized graphics processors) or a combination of hardware and software. A user input device 508 may allow a user to control and input information to information handling system 500. Additional components of the information handling system 500 may include one or more disk drives, output devices 512, such as a video display, and one or more network ports for communication with external devices as well as a user input device 508 (e.g., keyboard, mouse, etc.). Information handling system 500 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 510 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 6:
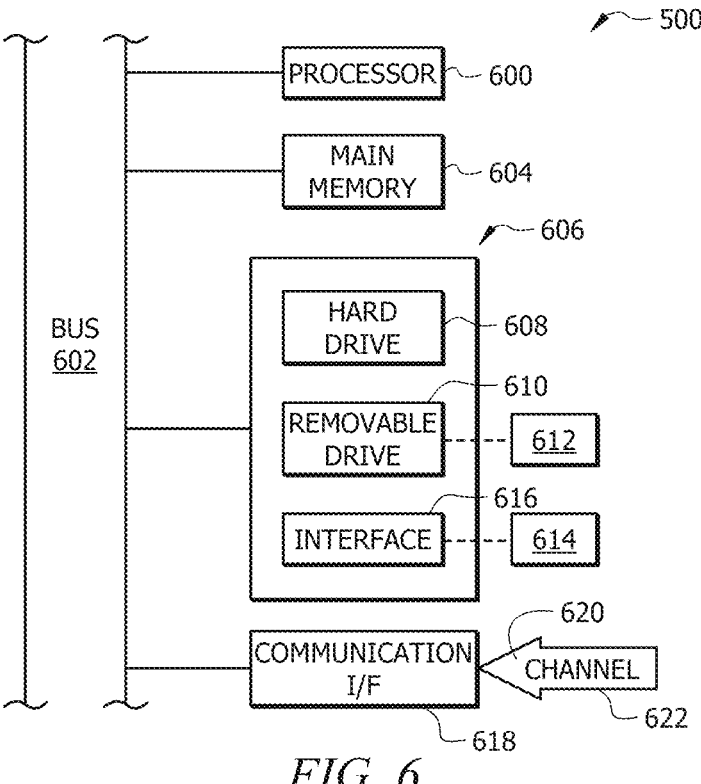
FIG. 6 illustrates additional detail of an information handling system, according to embodiments of this disclosure.

FIG. 6 illustrates additional detail of information handling system 500. For example, information handling system 500 may include one or more processors, such as processor 600. Processor 600 may be connected to a communication bus 602. Various software embodiments are described in terms of this exemplary computer system. After reading this description, it will become apparent to a person skilled in the relevant art how to implement the example embodiments using other computer systems and/or computer architectures.

Information handling system 500 may also include a main memory 604, preferably random-access memory (RAM), and may also include a secondary memory 606. Secondary memory 606 may include, for example, a hard disk drive 608 and/or a removable storage drive 610, representing a floppy disk drive, a magnetic tape drive, an optical disk drive, etc. Removable storage drive 610 may read from and/or writes to a removable storage unit 612 in any suitable manner. Removable storage unit 612, represents a floppy disk, magnetic tape, optical disk, etc. which is read by and written to by removable storage drive 610. As will be appreciated, removable storage unit 612 includes a computer usable storage medium having stored therein computer software and/or data.

In alternative embodiments, secondary memory 606 may include other operations for allowing computer programs or other instructions to be loaded into information handling system 500. For example, a removable storage unit 614 and an interface 616. Examples of such may include a program cartridge and cartridge interface (such as that found in video game devices), a removable memory chip (such as an EPROM, or PROM) and associated socket, and other removable storage units 614 and interfaces 616 which may allow software and data to be transferred from removable storage unit 614 to information handling system 500.

In examples information handling system 500 may also include a communications interface 618. Communications interface 618 may allow software and data to be transferred between information handling system 500 and external devices. Examples of communications interface 618 may include a modem, a network interface (such as an Ethernet card), a communications port, a PCMCIA slot and card, etc. Software and data transferred via communications interface 618 are in the form of signals 620 that may be electronic, electromagnetic, optical or other signals capable of being received by communications interface 618. Signals 620 may be provided to communications interface via a channel 622. Channel 622 carries signals 620 and may be implemented using wire or cable, fiber optics, a phone line, a cellular phone link, an RF link and/or any other suitable communications channels. For example, information handling system 500 includes at least one memory 604 operable to store computer-executable instructions, at least one communications interface 602, 618 to access the at least one memory 604; and at least one processor 600 configured to access the at least one memory 604 via the at least one communications interface 602, 618 and execute computer-executable instructions.

In this document, the terms "computer program medium" and "computer usable medium" are used to generally refer to media such as removable storage unit 612, a hard disk installed in hard disk drive 608, and signals 620. These computer program products may provide software to computer system 500.

Computer programs (also called computer control logic) may be stored in main memory 604 and/or secondary memory 606. Computer programs may also be received via communications interface 618. Such computer programs, when executed, enable information handling system 500 to perform the features of the example embodiments as discussed herein. In particular, the computer programs, when executed, enable processor 600 to perform the features of the example embodiments. Accordingly, such computer programs represent controllers of information handling system 500.

In examples with software implementation, the software may be stored in a computer program product and loaded into information handling system 500 using removable storage drive 610, hard disk drive 608 or communications interface 618. The control logic (software), when executed by processor 600, causes processor 600 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

The methods described herein may be carried out, at least in part, using a computer system including a computer-accessible medium, the computer-accessible medium containing a computer program that causes a processor to execute instructions that carry out at least some of the method steps described herein. In general, a computer-accessible medium may include any tangible or non-transitory storage media or memory media such as electronic, magnetic, or optical media—e.g., disk or CD/DVD-ROM coupled to the computer. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM), flash memory, or other volatile memory types. Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link According to embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The predictive tailoring of geopolymer compositions provided herein can be applied to any of the various geopolymer technologies/compositions to overcome barriers to usage and to ensure effective performance properties are attained when such tailored geopolymer compositions are utilized. A method of compressive strength, as described herein, can be created and utilized to tailor a geopolymer slurry/composition, providing a geopolymer recipe that meets compressive strength requirements/targets.

The tailored geopolymer slurries/compositions formed via the geopolymer recipe meeting compressive strength requirements, as determined by the geopolymer compressive strength model, may be used in a variety of subterranean operations. For example, in subterranean well construction, a pipe string (e.g., casing, liners, expandable tubulars, etc.) may be run into a wellbore and cemented in place. The geopolymer slurries/compositions can be utilized, in embodiments, in a primary cementing method, wherein a geopolymer slurry/composition can be pumped into an annulus between the walls of the wellbore and the exterior surface of the pipe string disposed therein. The geopolymer slurry/composition can set in the annular space, thereby forming an annular sheath of hardened, substantially impermeable cement (i.e., a geopolymer cement sheath) that may support and position the pipe string in the wellbore and may bond the exterior surface of the pipe string to the subterranean formation. Among other things, the cement sheath surrounding the pipe string can function to prevent the migration of fluids in the annulus, as well as protecting the pipe string from corrosion. Tailored geopolymer slurries/compositions according to this disclosure can also be utilized in remedial cementing methods, for example, to seal cracks or holes in pipe strings or cement sheaths, to seal highly permeable formation zones or fractures, to place a cement plug, and the like. In embodiments, tailored geopolymer slurries/compositions according to this disclosure can also be utilized in above ground and/or non-wellbore applications.

Broad varieties of cement compositions may be used in subterranean cementing operations. Hydraulic cement compositions may be used in subterranean operations, particularly completion and remedial operations. A variety of hydraulic cement compositions may be used in subterranean cementing operations with the most common cement compositions including Portland cement. However, Portland cement has drawbacks in its method of preparation, methods of implementation, and final set compositions. The energy requirements to produce Portland cement may be quite high, and heat loss during production can further cause actual energy requirements to be even greater. The manufacturing process of Portland cements also has batch-to-batch variations that may yield unpredictable results when applied in a wellbore. Additionally, the Portland cement slurries may have finite set times, thereby limiting the amount of time that the cement slurry may be stored prior to use. In addition to manufacturing drawbacks, the implementation of Portland cements in subterranean formations also may have drawbacks. Salts, particularly multivalent salts, often cause issues during the pumping and installation of a Portland cement. Additionally, once the Portland cements are set within a wellbore, corrosive components, like salts, carbonic acid, and hydrogen sulfide, found within some subterranean formations may cause failure of Portland cement structure. As used herein, the term "corrosive" refers to a substance that destroys or irreversibly damages another surface or substance with which it comes into contact. Decreased cement integrity may lead to inefficient zonal isolation and in extreme cases complete failure of the cement composition. The methods of the present disclosure avoid drawbacks of Portland and other hydraulic cements and other conventional cements via the use of tailored geopolymer recipes/slurries/ compositions that may include one or more geopolymer materials, as described herein.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The following examples are illustrative of the geopolymer cement compositions and methods discussed above and are not intended to be limiting.

EXAMPLES

Example 1: Example Model

Composition, test conditions and measured compressive strength of twenty-eight different data points were utilized to build a model of geopolymer compressive strength, according to this disclosure. Understanding of the geopolymer reaction was utilized in in providing initial estimates for values of the primary factors for the model. The significance of these factors was further validated statistically using the test data. As described hereinabove, the following six factors were discovered to impact the compressive strength of a geopolymer composition:
1. Atomic ratio $$\frac{Si}{Al};$$

2. Temperature;

$$\frac{Metal\ silicate\ mass}{Aluminosilicate\ mass};$$

$$\frac{Water\ mass}{Aluminosilicate\ mass};$$

$$\frac{Aluminosilicate\ mass}{Slurry\ mass};$$

and
6. Duration.

Additional factors may affect compressive strength, and such additional factors can be revealed with the use of a wide variety of test data, as will be apparent to those of skill in the art and with the help of this disclosure. The exact form of the model can be either linear or non-linear or any other black box-based approach (e.g. Neural Nets). To demonstrate an example model, a linear model was developed using the test data and the above-noted six factors found to be particularly relevant to predicting the compressive strength of the geopolymer compositions.

Figure 7:
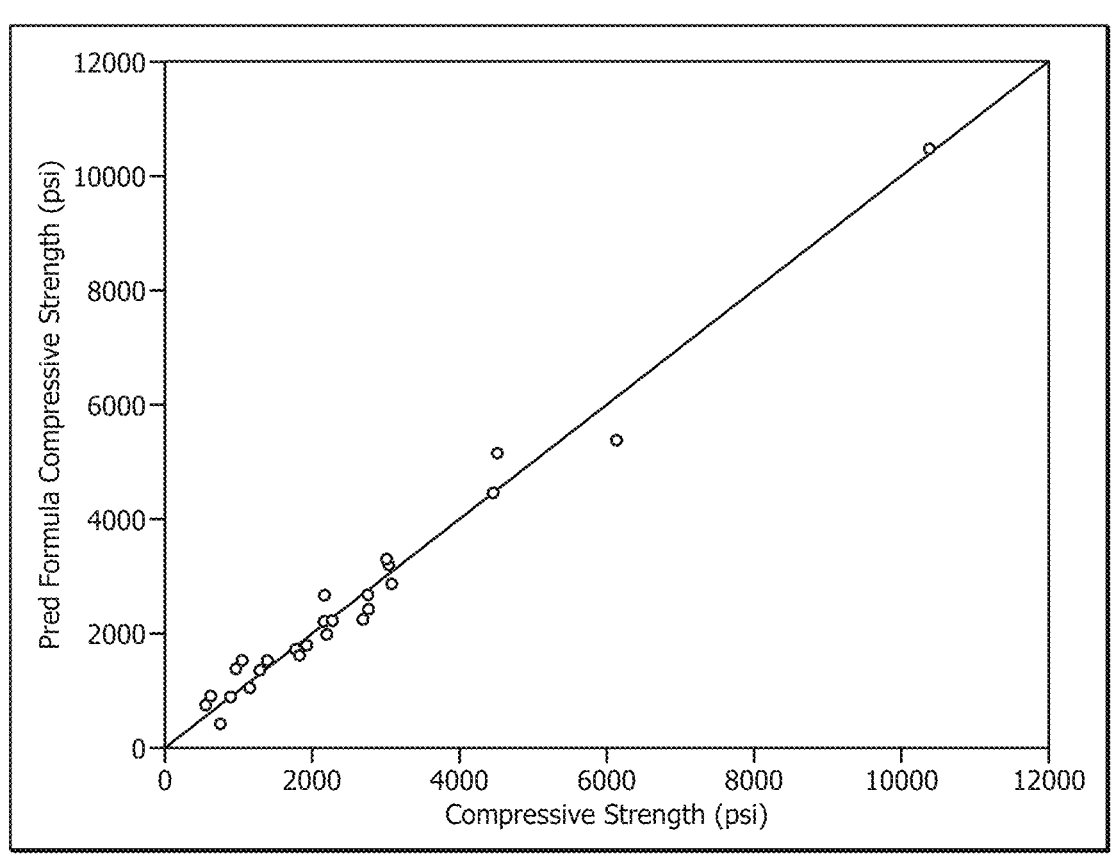
FIG. 7 is a parity plot of a compressive strength model for geopolymers, according to Example 1 of this disclosure.

FIG. 7 provides a parity plot of the results of this Example 1. A p-value, also known as a probability value, is a statistical metric that indicates the likelihood of obtaining the observed data under the null hypothesis of a statistical test. The p-value can be utilized to determine whether the results of an experiment are statistically significant by assessing how likely it is that the observed results occurred by random chance. A lower p-value provides stronger evidence that the observed results are less likely a result of random variation. The $R^2$ value of the data in FIG. 7 was 0.98, indicate a very good fit of the model to the data. The good parity and high significance (e.g., low p-value) of all six model factors (e.g., less than or equal to about 0.005), as illustrated in FIG. 7, and the high $R^2$ value indicate the success of the example model in predicting compressive strength for a given geopolymer composition and vice-versa.

Example 2: Example Workflow for Zonal Isolation

Figure 8:
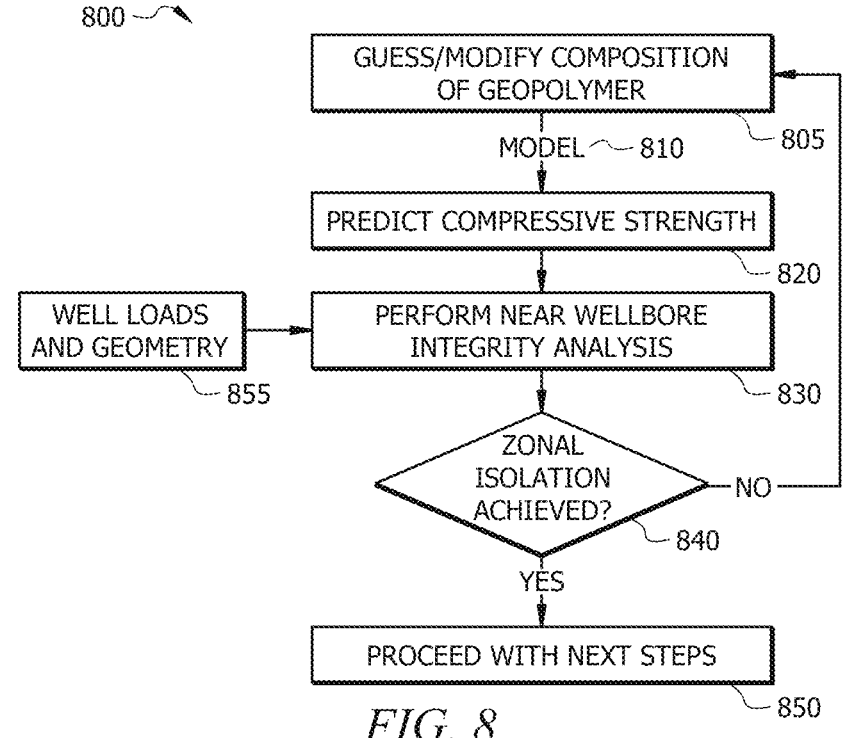
FIG. 8 is a schematic of a proposed workflow, according to Example 2 of this disclosure.

A compressive strength model, such as described herein and an example of which is described in Example 1, can be used in the proposed workflow to achieve the objective of tailoring an effective geopolymer composition for a specific application, such as and without limitation, zonal isolation. As shown in FIG. 8, which is a schematic of a proposed workflow for zonal isolation, according to embodiments of this disclosure, a workflow of this disclosure can include estimating/modifying (e.g., providing/adjusting) a composition of a geopolymer for zonal isolation 805, utilizing a model 810 as described herein to predict compressive strength 820 of the geopolymer composition/modified geopolymer composition, performing near wellbore integrity analysis 830, which can utilize well loads and geometry 835, determining if zonal isolation is achieved at 840 (e.g., by comparing the predicted compressive strength determined at 820 with model 810 to a target/required compressive strength determined by the near wellbore integrity analysis at 830), if the zonal isolation is achieved, proceeding with next steps 850 (e.g., utilizing the geopolymer composition determined to provide zonal isolation at 840 in a zonal isolation operation), and, if zonal isolation is not achieved at 840 (e.g., if the predicted compressive strength obtained at 820 via model 810 is determined at 840 to not be sufficient to provide zonal isolation, repeating steps 805, 820, 830, 840, or a combination thereof, until a geopolymer composition that provides zonal isolation at 840 is found. For example, if zonal isolation is not achieved at 840 (the answer is "no"), the geopolymer composition can be modified at 805 or another geopolymer composition estimated, the model 810 utilized to predict the compressive strength of the new/modified geopolymer composition at 820, and the predicted compressive strength compared with the required compressive strength (previously determined at 830 using well loads and geometry at 835, or recalculated again at 830) at 840. If the answer to 840 is "Yes", proceed with additional steps 850, as noted above, or, if the answer at 840 is "No", returning again to step 805 to estimate a new geopolymer composition or modify the prior geopolymer composition examined until arriving upon a geopolymer composition that achieves zonal isolation at 840. Although zonal isolation is utilized as an exemplary application for the geopolymer composition in this Example 2, other sealing/cementing operations above and below ground can be the subject of a workflow/method of this disclosure, as will be apparent to those of skill in the art and with the help of this disclosure.

ADDITIONAL DISCLOSURE

The following are non-limiting, specific embodiments in accordance with the present disclosure:

In a first embodiment, a method comprises: providing a geopolymer recipe (e.g., a geopolymer cement, settable spacer) comprising a geopolymer material, wherein the geopolymer material comprises an aluminosilicate source, a metal silicate source, an alkaline activator, and water; and a required compressive strength (e.g., a required ultimate compressive strength, and/or a required time dependent compressive strength); using a compressive strength model of the geopolymer cement recipe to predict a compressive strength and comparing the required compressive strength to the predicted compressive strength output of the model; preparing a geopolymer composition based at least in part on the model; and introducing the geopolymer composition into a subterranean formation.

A second embodiment can include the method of the first embodiment further comprising creating the model by modeling an ultimate compressive strength of the geopolymer recipe, or modeling a time dependency of compressive strength of the geopolymer recipe.

A third embodiment can include the method of the first or the second embodiment, wherein using the model comprises correlating the (e.g., ultimate) compressive strength to at least one of an atomic ratio of silicon to aluminum (Si/Al) of the aluminosilicate source, a temperature, a ratio of a mass of the metal silicate source to a mass of the aluminosilicate source, e.g., $$\left( \frac{\text{metal silicate mass}}{\text{aluminosilicate mass}} \right),$$

a ratio of a mass of water to the mass of the aluminosilicate source, e.g., $$\left( \frac{\text{water mass}}{\text{aluminosilicate mass}} \right),$$

a ratio of the mass of the aluminosilicate source to a mass of a slurry of the geopolymer recipe, e.g., $$\left( \frac{\text{aluminosilicate mass}}{\text{slurry mass}} \right),$$

and a duration (e.g., a wait on cement time) of the geopolymer recipe reaction.

A fourth embodiment can include the method of any one of the first to third embodiments, wherein preparing the geopolymer composition based at least in part on the model further comprises, when the comparing indicates that the predicted compressive strength output of the model is less than the required compressive strength, adjusting the geopolymer recipe to provide an adjusted geopolymer recipe, utilizing the model to determine an adjusted compressive strength of an adjusted geopolymer composition having or conforming to, compositionally, the adjusted geopolymer recipe, and comparing the adjusted compressive strength of the adjusted geopolymer composition with the required compressive strength.

A fifth embodiment can include the method of the fourth embodiment, wherein adjusting the geopolymer recipe further comprises adjusting a concentration of the water, the aluminosilicate source, the metal silicate source, the alkali activator, or a combination thereof, in the geopolymer recipe.

A sixth embodiment can include the method of the fourth or fifth embodiment further comprising repeating the adjusting the geopolymer recipe to provide an adjusted geopolymer recipe, utilizing the model to determine an adjusted compressive strength of the adjusted geopolymer composition, and comparing the adjusted compressive strength of the adjusted geopolymer composition with the required compressive strength until the updated compressive strength output of the model is not less than the required compressive strength.

A seventh embodiment can include the method of the sixth embodiment, further comprising performing the repeating until the updated compressive strength output of the model is within at least 50, 40, 30, 20, 15, 10, 9, 8, 7, 6, 5, 4, 3, 2, or 1% of the required compressive strength.

An eighth embodiment can include the method of any one of the first to seventh embodiments further comprising determining the required compressive strength.

A ninth embodiment can include the method of the eighth embodiment, wherein determining the required compressive strength comprises performing near wellbore integrity analysis, based on well load and geometry of a well.

A tenth embodiment can include the method of any one of the first to ninth embodiments, wherein the aluminosilicate source is selected from the a metakaolin clay, a calcined clay, a partially calcined clay, a kaolinite clay, a lateritic clay, an illite clay, a volcanic rock (e.g., pumice, scoria), a mine tailing, blast furnace slag (e.g., granulated blast furnace slag, ground blast furnace slag), fly ash (e.g., coal fly ash, ASTM type C fly ash, ASTM type F fly ash), rice husk ash, aluminum-containing silica fume, natural aluminosilicate, synthetic aluminosilicate glass powder, zeolite, bentonite, a derivative thereof, or a combination thereof.

An eleventh embodiment can include the method of the tenth embodiment, wherein the aluminosilicate source is present in an amount of about 5% to about 80% by weight of the geopolymer composition.

A twelfth embodiment can include the method of any one of the first to eleventh embodiments, wherein the alkali activator comprises a metal hydroxide.

A thirteenth embodiment can include the method of the twelfth embodiment, wherein the metal hydroxide comprises sodium hydroxide, potassium hydroxide, or a combination thereof.

A fourteenth embodiment can include the method of any one of the first to thirteenth embodiments, wherein the metal silicate source comprises one or more of sodium silicate, sodium metasilicate, magnesium silicate, or potassium silicate.

A fifteenth embodiment can include the method of any one of the first to fourteenth embodiments, wherein the metal silicate source is present in an amount of about 1% to about 80% by weight of the geopolymer recipe.

A sixteenth embodiment can include the method of any one of the first to fifteenth embodiments, wherein the alkaline activator comprises one or more of a metal hydroxide, ammonium hydroxide, sodium bicarbonate, sodium carbonate, lime, caustic soda, Portland cement, or hydrated lime.

A seventeenth embodiment can include the method of any one of the first to seventeenth embodiments, wherein the alkaline activator is present in an amount of about 1% to about 40% by weight of the geopolymer recipe.

An eighteenth embodiment can include the method of any one of the first to seventeenth embodiments, wherein the water comprises one or more of freshwater, saltwater, brine, or seawater.

A nineteenth embodiment can include the method of any one of the first to eighteenth embodiments, wherein the water is present in an amount of about 20% to about 95% by weight of the geopolymer recipe.

A twentieth embodiment can include the method of any one of the first to nineteenth embodiments, wherein introducing the geopolymer composition into the subterranean formation comprises introducing the geopolymer composition into an annulus between a wall of a wellbore and a conduit disposed in the wellbore.

A twenty first embodiment can include the method of any one of the first to twentieth embodiments, wherein the geopolymer composition further comprises one or more of a fluid loss control additive, a set retarder, or a set accelerator.

A twenty second embodiment can include the method of any one of the first to twenty first embodiments, wherein the geopolymer composition further comprises a fluid loss control additive, and the fluid loss control additive is present in an amount of about 0.1% to about 5% by weight of the geopolymer composition.

A twenty third embodiment can include the method of any one of the first to twenty second embodiments, wherein the geopolymer composition further comprises a set retarder, and the set retarder is present in an amount of about 0.1% to about 5% by weight of the geopolymer composition.

A twenty fourth embodiment can include the method of any one of the first to twenty third embodiments, wherein the aluminosilicate source is present in an amount of about 5% to about 80% by weight of the geopolymer recipe and/ geopolymer composition, the metal silicate source is present in an amount of about 1% to about 80% by weight of the geopolymer recipe and/or geopolymer composition, the alkaline activator is present in an amount of about 1% to about 40% by weight of the geopolymer recipe and/or geopolymer composition, and the water is present in an amount of about 20% to about 95% by weight of the geopolymer recipe and/or geopolymer composition.

A twenty fifth embodiment can include the method of any one of the first to twenty fourth embodiments, wherein the geopolymer recipe and/or geopolymer composition has a density in a range of from about 10 ppg to about 18 ppg.

In a twenty sixth embodiment, a method of treating a subterranean formation comprises: providing a geopolymer recipe comprising a geopolymer material, wherein the geopolymer material comprises an aluminosilicate source, a metal silicate source, an alkaline activator, and water; predicting a compressive strength (e.g., an ultimate compressive strength and/or a time dependent compressive strength) of a slurry according to the geopolymer recipe using a geopolymer compressive strength model; comparing the compressive strength of the slurry provided by the modeling to a compressive strength requirement (e.g., an ultimate compressive strength requirement and/or a time dependent compressive strength requirement); when the compressive strength of the slurry according to the geopolymer recipe provided by the modeling meets or exceeds the compressive strength requirement, preparing a geopolymer composition according to the geopolymer recipe; and placing the geopolymer recipe in a subterranean formation.

A twenty seventh embodiment can include the method of the twenty sixth embodiment, wherein the modeling further comprises modeling the compressive strength of a slurry of the geopolymer recipe as a function of at least one factor selected from an atomic ratio of silicon to aluminum (Si/Al) of the aluminosilicate source, a temperature, a ratio of a mass of the metal silicate source to a mass of the aluminosilicate source, e.g., $$\left(\frac{\text{metal silicate mass}}{\text{aluminosilicate mass}}\right),$$

a ratio of a mass of water to the mass of the aluminosilicate source, e.g., $$\left(\frac{\text{water mass}}{\text{aluminosilicate mass}}\right),$$

a ratio of the mass of the aluminosilicate source to a mass of a slurry of the geopolymer recipe, e.g., $$\left(\frac{\text{aluminosilicate mass}}{\text{slurry mass}}\right),$$

and a duration (e.g., a wait on cement time) of the slurry of the geopolymer recipe reaction.

A twenty eighth embodiment can include the method of the twenty seventh embodiment further comprising, when the comparing indicates that the predicted compressive strength output of the model is less than the required compressive strength, adjusting the geopolymer recipe to provide an adjusted geopolymer recipe, utilizing the model to determine an adjusted compressive strength of an adjusted geopolymer composition having or conforming to, compositionally, the adjusted geopolymer recipe, and comparing the adjusted compressive strength of the adjusted geopolymer composition with the required compressive strength.

A twenty ninth embodiment can include the method of the twenty eighth embodiment, wherein adjusting the geopolymer recipe further comprises adjusting a concentration of the water, the aluminosilicate source, the metal silicate source, the alkali activator, or a combination thereof, in the geopolymer recipe.

A thirtieth embodiment can include the method of the twenty eighth or twenty ninth embodiment further comprising repeating the adjusting the geopolymer recipe to provide an adjusted geopolymer recipe, utilizing the model to determine an adjusted compressive strength of the adjusted geopolymer composition, and comparing the adjusted compressive strength of the adjusted geopolymer composition with the required compressive strength until the updated predicted compressive strength output of the model meets (e.g., is greater than or about equal to) the required compressive strength.

In a thirty first embodiment, a method comprises: predicting a compressive strength of a slurry according to a geopolymer recipe using a geopolymer compressive strength model, wherein the geopolymer recipe comprises an aluminosilicate source, a metal silicate source, an alkaline activator, and water; and introducing the geopolymer slurry into a subterranean formation during a wellbore servicing operation for which a required compressive strength is less than or equal to the predicted compressive strength, wherein the compressive strength of the slurry according to the geopolymer recipe is predicted as a function of at least one factor selected from an atomic ratio of silicon to aluminum (Si/Al) of the aluminosilicate source, a temperature, a ratio of a mass of the metal silicate source to a mass of the aluminosilicate source, e.g., $$\left(\frac{\text{metal silicate mass}}{\text{aluminosilicate mass}}\right),$$

a ratio of a mass of water to the mass of the aluminosilicate source, e.g., $$\left(\frac{\text{water mass}}{\text{aluminosilicate mass}}\right),$$

a ratio of the mass of the aluminosilicate source to a mass of a slurry of the geopolymer recipe, e.g., $$\left(\frac{\text{aluminosilicate mass}}{\text{slurry mass}}\right),$$

and a duration (e.g., a wait on cement time) of the slurry of the geopolymer recipe reaction.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
providing a geopolymer recipe comprising a geopolymer material, wherein the geopolymer material comprises an aluminosilicate source, a metal silicate source, an alkaline activator, and water; and a required compressive strength;
using a compressive strength model of the geopolymer recipe to generate a predicted compressive strength output and comparing the required compressive strength to the predicted compressive strength output of the compressive strength model, wherein using the compressive strength model comprises correlating compressive strength to at least one of an atomic ratio of silicon to aluminum (Si/Al) of the aluminosilicate source, a ratio of a mass of the metal silicate source to a mass of the aluminosilicate source, and a ratio of the mass of the aluminosilicate source to a mass of a slurry of the geopolymer recipe;
preparing a geopolymer composition based at least in part on the compressive strength model; and
introducing the geopolymer composition into a subterranean formation.

2. The method of claim 1, wherein using the compressive strength model comprises correlating compressive strength to the atomic ratio of silicon to aluminum (Si/Al) of the aluminosilicate source, a temperature, the ratio of a mass of the metal silicate source to a mass of the aluminosilicate source, a ratio of a mass of water to the mass of the aluminosilicate source, the ratio of the mass of the aluminosilicate source to a mass of a slurry of the geopolymer recipe, and a duration of the geopolymer recipe reaction.

3. The method of claim 1, wherein preparing the geopolymer composition based at least in part on the compressive strength model further comprises, when the comparing indicates that the predicted compressive strength output of the compressive strength model is less than the required compressive strength, adjusting the geopolymer recipe to provide an adjusted geopolymer recipe, utilizing the compressive strength model to determine an adjusted compressive strength of an adjusted geopolymer composition, and comparing the adjusted compressive strength of the adjusted geopolymer composition with the required compressive strength.

4. The method of claim 3, wherein adjusting the geopolymer recipe further comprises adjusting a concentration of the water, the aluminosilicate source, the metal silicate source, the alkali activator, or a combination thereof, in the geopolymer recipe.

5. The method of claim 3 further comprising repeating the adjusting the geopolymer recipe to provide an adjusted geopolymer recipe, utilizing the compressive strength model to determine an adjusted compressive strength of the adjusted geopolymer composition, and comparing the adjusted compressive strength of the adjusted geopolymer composition with the required compressive strength until the adjusted compressive strength output of the compressive strength model is not less than the required compressive strength.

6. The method of claim 1, wherein the aluminosilicate source is selected from the a metakaolin clay, a calcined clay, a partially calcined clay, a kaolinite clay, a lateritic clay, an illite clay, a volcanic rock, a mine tailing, blast furnace slag, fly ash, rice husk ash, aluminum-containing silica fume, natural aluminosilicate, synthetic aluminosilicate glass powder, zeolite, bentonite, a derivative thereof, or a combination thereof.

7. The method of claim 6, wherein the aluminosilicate source is present in an amount of about 5% to about 80% by weight of the geopolymer composition.

8. The method of claim 1, wherein the metal silicate source is present in an amount of about 1% to about 80% by weight of the geopolymer recipe.

9. The method of claim 1, wherein the alkaline activator comprises one or more of a metal hydroxide, ammonium hydroxide, sodium bicarbonate, sodium carbonate, lime, caustic soda, Portland cement, or hydrated lime.

10. The method of claim 1, wherein the alkaline activator is present in an amount of about 1% to about 40% by weight of the geopolymer recipe.

11. The method of claim 1, wherein the water is present in an amount of about 20% to about 95% by weight of the geopolymer recipe.

12. The method of claim 1, wherein introducing the geopolymer composition into the subterranean formation comprises introducing the geopolymer composition into an annulus between a wall of a wellbore and a conduit disposed in the wellbore.

13. The method of claim 1, wherein the geopolymer composition further comprises one or more of a fluid loss control additive, a set retarder, or a set accelerator.

14. The method of claim 1, wherein the aluminosilicate source is present in an amount of about 5% to about 80% by weight of the geopolymer recipe and/geopolymer composition, the metal silicate source is present in an amount of about 1% to about 80% by weight of the geopolymer recipe and/or geopolymer composition, the alkaline activator is present in an amount of about 1% to about 40% by weight of the geopolymer recipe and/or geopolymer composition, and the water is present in an amount of about 20% to about 95% by weight of the geopolymer recipe and/or geopolymer composition.

15. A method of treating a subterranean formation, the method comprising:
providing a geopolymer recipe comprising a geopolymer material, wherein the geopolymer material comprises an aluminosilicate source, a metal silicate source, an alkaline activator, and water;
predicting a compressive strength of a slurry according to the geopolymer recipe using a geopolymer compressive strength model, wherein the predicting comprises modeling the compressive strength of a slurry of the geopolymer recipe as a function of at least one factor selected from an atomic ratio of silicon to aluminum (Si/Al) of the aluminosilicate source, a ratio of a mass of the metal silicate source to a mass of the aluminosilicate source, and a ratio of the mass of the aluminosilicate source to a mass of a slurry of the geopolymer recipe;
comparing the compressive strength of the slurry provided by the modeling to a compressive strength requirement;

when the compressive strength of the slurry according to the geopolymer recipe provided by the modeling meets or exceeds the compressive strength requirement, preparing a geopolymer composition according to the geopolymer recipe; and placing the geopolymer recipe in a subterranean formation.

16. The method of claim 15, wherein the predicting comprises modeling the compressive strength of a slurry of the geopolymer recipe as a function of the atomic ratio of silicon to aluminum (Si/Al) of the aluminosilicate source, a temperature, the ratio of a mass of the metal silicate source to a mass of the aluminosilicate source, a ratio of a mass of water to the mass of the aluminosilicate source, the ratio of the mass of the aluminosilicate source to a mass of a slurry of the geopolymer recipe, and a duration of the slurry of the geopolymer recipe reaction.

17. The method of claim 16 further comprising, when the comparing indicates that the predicted compressive strength output of the compressive strength model is less than the required compressive strength, adjusting the geopolymer recipe to provide an adjusted geopolymer recipe, utilizing the compressive strength model to determine an adjusted compressive strength of an adjusted geopolymer composition, and comparing the adjusted compressive strength of the adjusted geopolymer composition with the required compressive strength.

18. The method of claim 17, wherein adjusting the geopolymer recipe further comprises adjusting a concentration of the water, the aluminosilicate source, the metal silicate source, the alkali activator, or a combination thereof, in the geopolymer recipe.

19. The method of claim 17 further comprising repeating the adjusting the geopolymer recipe to provide an adjusted geopolymer recipe, utilizing the compressive strength model to determine an adjusted compressive strength of the adjusted geopolymer composition, and comparing the adjusted compressive strength of the adjusted geopolymer composition with the required compressive strength until the updated predicted compressive strength output of the compressive strength model meets the required compressive strength.

20. A method comprising:

predicting a compressive strength of a slurry according to a geopolymer recipe using a geopolymer compressive strength model, wherein the geopolymer recipe comprises an aluminosilicate source, a metal silicate source, an alkaline activator, and water; and introducing the geopolymer slurry into a subterranean formation during a wellbore servicing operation for which a required compressive strength is less than or equal to the predicted compressive strength, wherein the compressive strength of the slurry according to the geopolymer recipe is predicted as a function of an atomic ratio of silicon to aluminum (Si/Al) of the aluminosilicate source, a temperature, a ratio of a mass of the metal silicate source to a mass of the aluminosilicate source, a ratio of a mass of water to the mass of the aluminosilicate source, a ratio of the mass of the aluminosilicate source to a mass of a slurry of the geopolymer recipe, and a duration of the slurry of the geopolymer recipe reaction.

* * * * *